(12) United States Patent
Azuma et al.

(10) Patent No.: US 8,248,495 B2
(45) Date of Patent: *Aug. 21, 2012

(54) IMAGE PICKING-UP PROCESSING DEVICE, IMAGE PICKING-UP DEVICE, IMAGE PROCESSING METHOD AND COMPUTER PROGRAM

(75) Inventors: Takeo Azuma, Kyoto (JP); Taro Imagawa, Osaka (JP)

(73) Assignee: Panasonic Corporation, Osaka (JP)

( * ) Notice: Subject to any disclaimer, the term of this patent is extended or adjusted under 35 U.S.C. 154(b) by 333 days.

This patent is subject to a terminal disclaimer.

(21) Appl. No.: 12/517,852

(22) PCT Filed: Jul. 25, 2008

(86) PCT No.: PCT/JP2008/001997
§ 371 (c)(1),
(2), (4) Date: Jun. 5, 2009

(87) PCT Pub. No.: WO2009/019823
PCT Pub. Date: Feb. 12, 2009

(65) Prior Publication Data
US 2010/0315539 A1 Dec. 16, 2010

(30) Foreign Application Priority Data
Aug. 7, 2007 (JP) ................................. 2007-205835

(51) Int. Cl.
*H04N 9/083* (2006.01)
(52) U.S. Cl. ........................................ 348/277; 348/280
(58) Field of Classification Search ........... 348/266–283
See application file for complete search history.

(56) References Cited

U.S. PATENT DOCUMENTS
2005/0057687 A1  3/2005 Irani et al.
(Continued)

FOREIGN PATENT DOCUMENTS
JP          06-315154        11/1994
(Continued)

OTHER PUBLICATIONS
WO/2006/137253.*
(Continued)

*Primary Examiner* — Anthony J Daniels
(74) *Attorney, Agent, or Firm* — Renner, Otto, Boisselle & Sklar, LLP

(57) ABSTRACT

An image processing device and an image processing method capable of generating a moving image having a high resolution and a high frame rate are provided by suppressing the reduction in the amount of incident light on each camera. The imaging and processing device includes a separation section for separating visible light into at least a first color component and a second color component; a first imaging section for taking a moving image of the first color component, wherein the first imaging section takes images of the moving image with a first spatial resolution and a first temporal resolution by exposure for a first charge accumulation time period; a second imaging section for taking a moving image of the second color component, wherein the second imaging section takes images of the moving image with a second spatial resolution higher than the first spatial resolution and a second temporal resolution lower than the first temporal resolution by exposure for a second charge accumulation time period longer than the first charge accumulation time period; a control section for controlling imaging conditions of the first and the second imaging sections; and a processing section for generating a moving image of the second component having the temporal and spatial resolutions thereof increased, based on information on the moving image of each of the first color component and the second color component.

30 Claims, 13 Drawing Sheets

U.S. PATENT DOCUMENTS

2005/0219642 A1 10/2005 Yachida et al.
2007/0189386 A1* 8/2007 Imagawa et al. ......... 375/240.12

FOREIGN PATENT DOCUMENTS

| JP | 07-143439 | 6/1995 |
| JP | 07-203318 | 8/1995 |
| JP | 2005-515675 | 5/2005 |
| JP | 2005-318548 | 11/2005 |
| JP | 3934151 | 3/2007 |

OTHER PUBLICATIONS

International Search Report for corresponding application No. PCT/JP2008/001997 Nov. 11, 2008.

J.L. Barron et al., "Performance of Optical Flow Techniques", In Proc. Computer Vision and Pattern Recognition, 1992. pp. 236-242.

Co-pending U.S. Application: National Stage of PCT/JP2008/001998, filed Jun. 5, 2009.

* cited by examiner (a) BASELINE FRAME (IMAGE AT TIME t)    (b) REFERENCE FRAME (IMAGE AT TIME t + Δt)

IMAGE PICKING-UP PROCESSING DEVICE, IMAGE PICKING-UP DEVICE, IMAGE PROCESSING METHOD AND COMPUTER PROGRAM

TECHNICAL FIELD

The present invention relates to image processing of moving images, and more specifically to a technology for generating a moving image obtained by increasing at least one of the resolution and the frame rate of an imaged moving image by image processing.

BACKGROUND ART

Recently in the field of video input, the number of pixels of cameras for mobile phones and digital still cameras is increasing and the pixel pitch thereof is decreasing.

Various spatial resolutions are used for different levels of image quality required for various imaging devices. For example, the resolution of TV phones is of a relatively small number of pixels; for example, approximately QCIF (Quarter Common Intermediate Format; 176 pixels horizontally and 144 pixels vertically) or approximately QVGA (Quarter Video Graphics Array, 320 pixels horizontally and 144 pixels vertically). By contrast, the resolution of digital single-lens reflex cameras exceeds 10 million pixels.

Various temporal resolutions are also used for different levels of image quality. For example, regarding the temporal resolution of up to the number of pixels of HDTVs, imaging is performed at the video rate of consumer devices (30 frames/sec.). By contrast, for performing imaging at a greater number of pixels, the frame rate is merely several frames per second at the maximum, which is realized by the consecutive shooting function provided by digital still cameras.

Meanwhile, in the field of video display, flat TVs are rapidly spreading. In accordance with this, users are expected to view video materials by a combination of a camera and a display of various resolutions in the future.

Comparing the temporal and spatial resolutions of the camera on the input side ("temporal and spatial resolutions" means temporal resolution and spatial resolution; the same is also applied below) and the temporal and spatial resolutions of the display on the output side, the temporal and spatial resolutions of the display on the output side are higher in the currently available consumer devices. Therefore, general users today cannot easily obtain a video material which allows the device on the output side to make the maximum use of the performance thereof.

A reason why such a situation has occurred is that the reading speed is conventionally the bottleneck. The imaging at a high spatial resolution is limited to being performed at 5 frames per second, whereas the imaging at 30 frames per second is limited to being performed at the spatial resolution of HDTVs. For this reason, it is conventionally difficult to perform imaging at a high spatial resolution and a high frame rate.

In order to address the above-described problems, Patent Documents 1 through 3, for example, propose a method for providing both a high spatial resolution and a high frame rate, by which images having different temporal resolutions and different spatial resolutions are input from cameras of two systems to generate an image having a high spatial resolution and a high frame rate by signal processing. These patent documents describe a structure shown in FIG. 19.

FIG. 19 shows a structure of a conventional imaging device. Incident light on the imaging device is partially transmitted through a half mirror 171 and incident on a first camera 172. As a result, a moving image having a low resolution and a high frame rate is taken. Light which is incident on the imaging device and reflected by the half mirror 171 is incident on a second camera 173. As a result, a moving image having a high resolution and a low frame rate is taken.

An upconverter 174 receives the moving images taken by the first camera 172 and the second camera 173 and performs image processing to output a moving image having a high resolution and a high frame rate.

Patent Document 1: Japanese Laid-Open Patent Publication No. 7-143439

Patent Document 2: PCT Japanese National Phase Laid-Open Patent Publication No. 2005-515675

Patent Document 3: Japanese Laid-Open Patent Publication No. 2005-318548

DISCLOSURE OF THE INVENTION

Problems to be Solved by the Invention

However, in the above-described imaging device, the light is divided into two by the half mirror 171, and therefore the amount of light may be occasionally insufficient at the second camera 173 for higher resolution imaging, which has a smaller pixel size. In addition, the amount of light may be occasionally insufficient also at the first camera 172 for lower resolution imaging, for which an upper limit is set for the exposure time for taking a moving image. This lowers the luminance of the image, resulting in a dark image.

The present invention for solving the above-described problems has an object of providing an image processing device and an image processing method capable of preventing the amount of incident light on each of cameras from being reduced and generating a moving image having both a high resolution and a high frame rate.

Means for Solving the Problems

An imaging and processing device according to the present invention comprises a separation section for separating visible light into at least a first color component and a second color component; a first imaging section for taking a moving image of the first color component, the first imaging section taking images which form the moving image with a first spatial resolution and a first temporal resolution by exposure for a first charge accumulation time period; a second imaging section for taking a moving image of the second color component, the second imaging section taking images which form the moving image with a second spatial resolution higher than the first spatial resolution and a second temporal resolution lower than the first temporal resolution by exposure for a second charge accumulation time period longer than the first charge accumulation time period; a control section for controlling imaging conditions of the first imaging section and the second imaging section; and a processing section for generating a moving image of the second component having the temporal and spatial resolutions thereof increased, based on information on the moving image of the first color component and information on the moving image of the second color component.

An imaging and processing device according to the present invention comprises a separation section for separating visible light into at least a first color component and a second color component; a first imaging section for taking a moving image of the first color component, the first imaging section taking images which form the moving image with a first spatial resolution and a first temporal resolution by exposure for a first charge accumulation time period; a second imaging section for taking a moving image of the second color component, the second imaging section taking images which form the moving image with a second spatial resolution higher than the first spatial resolution and a second temporal resolution lower than the first temporal resolution by exposure for a second charge accumulation time period longer than the first charge accumulation time period; a motion detection section for generating motion information based on a time-wise change of the moving image of the first color component; and a processing section for generating a moving image of the second component having the temporal and spatial resolutions thereof increased, based on information on the moving image of the first color component, information on the moving image of the second color component and the motion information.

The processing section may hold a relational expression of the moving image of the second color component taken by the second imaging section and the moving image of the second component having the spatial resolution thereof increased; and the processing section may generate the moving image of the second component having the spatial resolution thereof increased, in accordance with the degree at which the relational expression is fulfilled, using, as constraining conditions, temporal and spatial correspondence between the moving image of the first color component and the moving image of the second color component, a condition for smoothness between pixels close to each other in the image, an assumption that the brightness of an imaging subject moving in the image is constant, and a local correlation between pixel values of the first color component and the second color component.

The processing section may output a moving image, which fulfills the relational expression best under the moving image of the second color component taken by the second imaging section and the constraining conditions, as the moving image of the second component having the spatial resolution thereof increased.

The processing section may hold a relational expression of the moving image of the second color component taken by the second imaging section and the moving image of the second component having the spatial resolution thereof increased; and the processing section may output a moving image fulfilling the relational expression as the moving image of the second component having the spatial resolution thereof increased, using, as constraining conditions, temporal and spatial correspondence between the moving image of the first color component and the moving image of the second component, and a condition for smoothness between pixels close to each other in the image.

The processing section may hold a relational expression of the moving image of the second color component taken by the second imaging section and the moving image of the second component having the spatial resolution thereof increased; and the processing section may output a moving image fulfilling the relational expression as the moving image of the second component having the spatial resolution thereof increased, using, as constraining conditions, temporal and spatial correspondence between the moving image of the first color component and the moving image of the second color component, a condition for smoothness between pixels close to each other in the image, and an assumption that the brightness of an imaging subject moving in the image is constant.

The imaging and processing device may further comprise a third imaging section. The separation section may separate the visible light into the first color component, the second color component and a third color component; the third imaging section may take images which form a moving image of the third color component with a third spatial resolution and a third temporal resolution by exposure for a third charge accumulation time period; and the third charge accumulation time period may be shorter than the second charge accumulation time period, the third spatial resolution may be lower than the second spatial resolution, and the third temporal resolution may be higher than the second temporal resolution.

The processing section may hold a relational expression of the moving image of the second color component taken by the second imaging section and the moving image of the second component having the spatial resolution thereof increased; and the processing section may output a moving image fulfilling the relational expression as the moving image of the second component having the spatial resolution thereof increased, using, as constraining conditions, temporal and spatial correspondence between the moving image of the first color component, the moving image of the second color component and the moving image of the third color component, and a local correlation among pixel values of the first color component, the second color component and the third color component.

The processing section may hold a relational expression of the moving image of the second color component taken by the second imaging section and the moving image of the second component having the spatial resolution thereof increased; and the processing section may output a moving image fulfilling the relational expression as the moving image of the second component having the spatial resolution thereof increased, using, as constraining conditions, temporal and spatial correspondence among the moving image of the first color component, the moving image of the second color component and the moving image of the third color component, a condition for smoothness between pixels close to each other in the image, an assumption that the brightness of an imaging subject moving in the image is constant, and a local correlation among pixel values of the first color component, the second color component and the third color component.

An imaging device according to the present invention forms an image processing system together with an image processing device. The imaging device comprises a separation section for separating visible light into at least a first color component and a second color component; a first imaging section for taking a moving image of the first color component, the first imaging section taking images which form the moving image with a first spatial resolution and a first temporal resolution by exposure for a first charge accumulation time period; a second imaging section for taking a moving image of the second color component, the second imaging section taking images which form the moving image with a second spatial resolution higher than the first spatial resolution and a second temporal resolution lower than the first temporal resolution by exposure for a second charge accumulation time period longer than the first charge accumulation time period; and a control section for controlling imaging conditions of the first imaging section and the second imaging section. The imaging device outputs information on the moving image of the first color component and information on the moving image of the second color component in order to allow the image processing device to generate a moving image of the second component having the temporal resolution thereof increased.

The imaging device may further comprise a third imaging section. The separation section may separate the visible light into the first color component, the second color component and a third color component; the third imaging section may take images which form a moving image of the third color component with a third spatial resolution and a third temporal resolution by exposure for a third charge accumulation time period; and the third charge accumulation time period may be shorter than the second charge accumulation time period, the third spatial resolution may be lower than the second spatial resolution, and the third temporal resolution may be higher than the second temporal resolution.

An image processing device according to the present invention is an image processing device for receiving information on a moving image from an imaging device and processing the information. The imaging device includes a separation section for separating visible light into at least a first color component and a second color component; a first imaging section for taking a moving image of the first color component, the first imaging section taking images which form the moving image with a first spatial resolution and a first temporal resolution by exposure for a first charge accumulation time period; a second imaging section for taking a moving image of the second color component, the second imaging section taking images which form the moving image with a second spatial resolution higher than the first spatial resolution and a second temporal resolution lower than the first temporal resolution by exposure for a second charge accumulation time period longer than the first charge accumulation time period; and a control section for controlling imaging conditions of the first imaging section and the second imaging section. The image processing device comprises a motion detection section for receiving information on the moving image of the first color component and information on the moving image of the second color component and generating motion information based on a time-wise change of the moving image of the first color component; and a processing section for generating a moving image of the second component having the spatial resolution thereof increased, based on the information on the moving image of the first color component, the information on the moving image of the second color component and the motion information.

An image processing method according to the present invention comprises the steps of receiving, from the above-described imaging device, the information on the taken moving image of the first color component and the information on the taken moving image of the second color component; generating motion information based on a time-wise change of the moving image of the first color component; obtaining a relational expression of the moving image of the second color component and a moving image of the second component having a spatial resolution thereof increased; and generating the moving image of the second component having the spatial resolution thereof increased, in accordance with the degree at which the relational expression is fulfilled, using, as constraining conditions, temporal and spatial correspondence between the moving image of the first color component and the moving image of the second color component, a condition for smoothness between pixels close to each other in the image, and an assumption that the brightness of an imaging subject moving in the image is constant.

The step of generating the moving image of the second component may generate the moving image of the second component having the spatial resolution thereof increased, in accordance with the degree at which the relational expression is fulfilled, further using, as a constraining condition, a local correlation between the pixel values of the first color component and the second color component.

An image processing method according to the present invention comprises the steps of receiving, from the above-described imaging device, the information on the taken moving image of the first color component and the information on the taken moving image of the second color component; obtaining a relational expression of the moving image of the second color component and a moving image of the second component having a spatial resolution thereof increased; and generating the moving image of the second component having the spatial resolution thereof increased, in accordance with the degree at which the relational expression is fulfilled, using, as constraining conditions, temporal and spatial correspondence between the moving image of the first color component and the moving image of the second color component, and a condition for smoothness between pixels close to each other in the image.

An image processing method according to the present invention comprises the steps of receiving, from the above-described imaging device, the information on the taken moving image of the first color component and the information on the taken moving image of the second color component; obtaining a relational expression of the moving image of the second color component and a moving image of the second component having a spatial resolution thereof increased; and generating the moving image of the second component having the spatial resolution thereof increased, in accordance with the degree at which the relational expression is fulfilled, using, as constraining conditions, temporal and spatial correspondence between the moving image of the first color component and the moving image of the second color component, and a local correlation between the pixel values of the first color component and the second color component.

An image processing method according to the present invention comprises the steps of receiving, from the above-described imaging device, the information on the taken moving images of the first color component, the second color component and the third color component; obtaining a relational expression of the moving image of the second color component and a moving image of the second component having a spatial resolution thereof increased; and outputting a moving image fulfilling the relational expression as the moving image of the second component having the spatial resolution thereof increased, using, as constraining conditions, temporal and spatial correspondence among the moving image of the first color component, the moving image of the second color component and the moving image of the third color component, a condition for smoothness between pixels close to each other in the image, an assumption that the brightness of an imaging subject moving in the image is constant, and a local correlation among the pixel values of the first color component, the second color component and the third color component.

A computer program according to the present invention is a computer program for causing a processor included in an image processing device to generate data on a moving image based on data on a first moving image and data on a second moving image. The computer program causes the processor to execute the steps of receiving, from the above-described imaging device, the information on the taken moving images of the first color component, the second color component and the third color component; reading a relational expression of the moving image of the second color component and a moving image of the second component having a spatial resolution thereof increased; and generating a moving image of the second component having a spatial resolution thereof increased, in accordance with the degree at which the relational expression is fulfilled, using, as constraining conditions, temporal and spatial correspondence between the moving image of the first color component and the moving image of the second color component, a condition for smoothness between pixels close to each other in the image, an assumption that the brightness of an imaging subject moving in the image is constant, and a local correlation between the pixel values of the first color component and the second color component.

The computer program may be recorded on a recording medium.

Effects of the Invention

An imaging and processing device according to the present invention makes it possible to generate a multi-color moving image having both a high resolution and a high frame rate from moving images of a plurality of color components having different resolutions and different frame rates. Each of the moving images of the plurality of color components is taken by separating the incident light color by color using, for example, a dichroic mirror, without using a half mirror or the like. Owing to this, unlike the conventional art using a half mirror, the amount of light received by each imaging section is not reduced to half. Therefore, the amount of light of the moving image of each color component is not reduced, and so a bright moving image is provided. Based on such color component images, a moving image having both a high resolution and a high frame rate is generated. The moving image thus obtained is also bright.

BRIEF DESCRIPTION OF THE DRAWINGS

FIGS. 3(a) and (b) respectively show a baseline frame and a reference frame used for performing motion detection using block matching.

DESCRIPTION OF THE REFERENCE NUMERALS

| | |
|---|---|
| 101 | Lens system |
| 102 | Dichroic mirror |
| 103 | First imaging section |
| 104 | Second imaging section |
| 105 | Image processing section |
| 106 | Upconverter for G |
| 107 | Upconverter for R and B |
| 120 | Control section |

BEST MODE FOR CARRYING OUT THE INVENTION

Hereinafter, embodiments of an imaging and processing device according to the present invention will be described with reference to the attached drawings.

Embodiment 1

Figure 1:
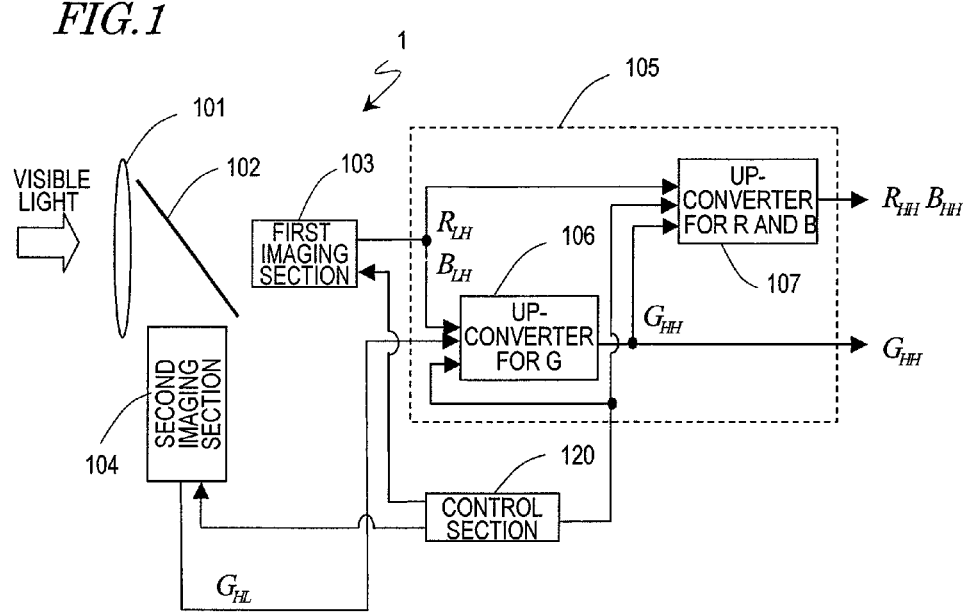
FIG. 1 shows a structure of an imaging and processing device according to Embodiment 1.

FIG. 1 shows a structure of an imaging and processing device 1 according to this embodiment. The imaging and processing device 1 includes a lens system 101, a dichroic mirror 102, a first imaging section 103, a second imaging section 104, an image processing section 105, and a control section 120.

In the following, a general function of each element will be first described, and then an operation of each element will be described in detail in relation with an operation of the imaging and processing device 1.

The lens system 101 converges incident light from outside the imaging and processing device 1, namely, an image of an imaging subject.

The dichroic mirror 102 allows red (R) and blue (B) components of the light to be transmitted therethrough and reflects a green (G) component of the light. Namely, the dichroic mirror 102 separates the incident light into the red (R) and blue (B) components and the green (G) component. Hereinafter, the red component will also be referred to as the "R component", the green component will also be referred to as the "G component", and the blue component will also be referred to as the "B component".

The first imaging section 103 takes a moving image of each of the R component and the B component with a short-time exposure, a low resolution and a high frame rate based on the incident light (here, the R component and the B component of the light), and outputs the resultant data. In order to obtain the moving image of the R component and the moving image of the B component, the first imaging section 103 may have a dichroic mirror inside thereof and may also include an imaging element for detecting the R component and the B component.

The second imaging section 104 takes a moving image of the G component with a long-time exposure, a high resolution and a low frame rate based on the incident light (here, the G component of the light), and outputs data on the moving image of the G component.

The image processing section 105 receives the data on the moving images corresponding to the light of the R component and the B component and the data on the moving image corresponding to the light of the G component. The image processing section 105 converts the data on each moving image into a moving image having a high resolution and a high frame rate by image processing, and outputs the resultant data.

The image processing section 105 includes an upconverter 106 for G and an upconverter 107 for R and B.

The upconverter 106 for G generates data on a moving image having a high resolution and a high frame rate as a result of increasing the frame rate of the G component. The upconverter 107 for R and B generates data on moving images having a high resolution and a high frame rate as a result of increasing the resolutions of the R component and the B component. The moving images are displayed by switching one or a plurality of images consecutively at a prescribed frame rate. The processing performed by the upconverter 107 for R and B for increasing the resolutions means increasing the number of pixels of each of the images forming the moving images.

The upconverter 106 for G and the upconverter 107 for R and B will be described later in detail.

The control section 120 controls the imaging conditions for taking the moving images using the first imaging section 103 and the second imaging section 104. The control section 120 outputs the control information to the upconverter 106 for G and the upconverter 107 for R and B.

Now, an operation of each element will be described together with an operation of the imaging and processing device 1.

The position of the lens system 101 is adjusted such that images of the imaging subject are formed on imaging elements of the first imaging section 103 and the second imaging section 104. The light which has passed through the lens system 101 is separated into an R component, a G component and a B component by the dichroic mirror 102.

The moving images of the R component and the B component are taken by the first imaging section 103 with the imaging conditions instructed by the control section 120, namely, with a short-time exposure, a low resolution and a high frame rate. Here, "low resolution" means, for example, the resolution of approximately the number of pixels of one frame of NTSC (720 pixels horizontally×480 pixels vertically) or a lower resolution of approximately the number of pixels of VGA (Video Graphics Array: 640 pixels horizontally×480 pixels vertically). "High frame rate" means about 30 fps (frames/sec.) through 60 fps. "Short-time exposure" means exposure for a time period of an upper limit determined by the frame rate (in this embodiment, 1/30 sec. through 1/60 sec.) at the longest.

The moving image of the G component is taken by the second imaging section 104, again with the imaging conditions instructed by the control section 120, namely, with a long-time exposure, a high resolution and a low frame rate. Here, "high resolution" means, for example, the resolution of the number of pixels of a general digital still camera (for example, 4000 pixels horizontally and 3000 pixels vertically). "Low frame rate" means a few tens of percent or 1/10 through 1/20 of that of the first imaging section 103 (for example, 3 fps (frames/sec.). "Long-time exposure" means exposure for a time period determined by the value of the low frame rate (for example, 1/3 sec.) at the longest.

In this embodiment, the first imaging section 103 and the second imaging section 104 operate while being synchronized to each other by the control section 120. However, it is not indispensable that the first imaging section 103 and the second imaging section 104 are synchronized to each other.

The above-described long/short-time exposure, high/low resolution and high/low frame rate are relative imaging conditions of the first imaging section 103 and the second imaging section 104. It is sufficient that the exposure time of each of the R component and the B component of a color image is shorter than that of the G component. It is sufficient that the resolution (here, corresponding to the number of pixels) of each of the R component and the B component is lower than that of the G component. It is sufficient that the frame rate of each of the R component and the B component is higher than that of the G component. The above-described ranges of numerical values are examples and not limiting.

Hereinafter, in this specification, a moving image of the G color component having a high (H) resolution and a low (L) frame rate will be represented as $G_{HL}$, and moving images of the R and B color components having a low (L) resolution and a high (H) frame rate will be represented respectively as $R_{LH}$ and $B_{LH}$. The first letter represents the color component, the second letter (first subscript) represents the resolution, and the third letter (second subscript) represents the frame rate.

The upconverter 106 for G receives data on the G image $G_{HL}$ taken with a long-time exposure, a high resolution and a low frame rate and data on the R image $R_{LH}$ and the B image $B_{LH}$ taken with a short-time exposure, a low resolution and a high frame rate as the imaging conditions, and outputs $G_{HH}$ as a result of increasing the resolution of $G_{HL}$.

Namely, the upconverter 106 for G generates a synthesized moving image as a result of increasing the frame rate while keeping the resolution. This means that the processing is performed such that the green synthesized moving image has the best subjective image quality.

The reason for performing the processing in this manner is that human sight has a feature of being more sensitive to green than to red or blue and therefore it is generally desirable that the subjective image quality of the green synthesized moving image is best.

In order to improve the subjective image quality of the green synthesized moving image, it is often considered preferable to take a green moving image with a high resolution and a low frame rate. For example, it is assumed that the imaging subject in an image is still or is moving only a little. In such a case, where the green moving image is taken with a high resolution and a low frame rate, the resolution of the green synthesized moving image is higher than that of the red or blue synthesized moving image and as a result, the subjective quality of the entire image is improved. It is also expected that the subjective image quality is further improved by increasing the frame rate of the green moving image as compared with the frame rate of the red or blue moving image.

Figure 2:
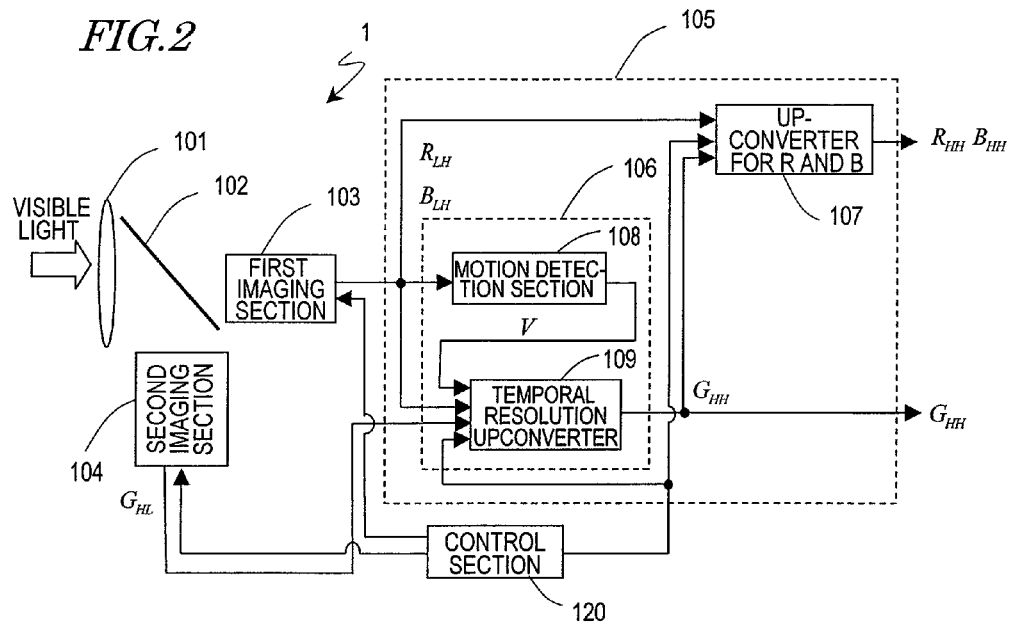
FIG. 2 shows a structure of an upconverter 106 for G in more detail.

FIG. 2 shows a structure of the upconverter 106 for G in more detail. In FIG. 2, elements common to those in the imaging and processing device shown in FIG. 1 bear identical reference numerals thereto and descriptions thereof will be omitted.

The upconverter 106 for G includes a motion detection section 108 and a temporal resolution upconverter 109.

The motion detection section 108 detects a motion (optical flow) from $R_{LH}$ and $B_{LH}$ by an existing known technology such as a block matching method, a gradient method, a phase correlation method or the like. One such known technology is described in, for example, J. L. Barron, D. J. Fleet, S. S. Beauchemin, and T. A. Burkitt, "Performance of Optical Flow Techniques", In Proc. Computer Vision and Pattern Recognition, pp. 236-242, 1992.

FIGS. 3(a) and (b) respectively show a baseline frame and a reference frame used for performing motion detection using block matching. The motion detection section 108 sets a window area A shown in FIG. 3(a) in a frame used as a baseline (image at time t of interest at which the motion is to be detected), and searches in the reference frame for a pattern similar to the pattern in the window area. As the reference frame, a frame next to the frame of interest is often used, for example.

Usually as shown in FIG. 3(b), a certain range (C in FIG. 3(b)) is preset as the search range, based on position B at which the moving amount is zero. The degree (extent) of similarity of the patterns is evaluated by calculating the sum of square differences (SSD) shown in expression 1 or the sum of absoluted differences (SAD) shown in expression 2 as the evaluation value.

$$SSD = \sum_{x,y \in W} (I(x+u, y+v, t+\Delta t) - I(x, y, t))^2 \quad \text{[Expression 1]}$$

$$SAD = \sum_{x,y \in W} |I(x+u, y+v, t+\Delta t) - I(x, y, t)| \quad \text{[Expression 2]}$$

In expressions 1 and 2, $x, y \in W$ means the coordinate value of the pixel encompassed in the window area of the baseline frame.

The motion detection section 108 changes (u, v) in the search range to search for a (u, v) set at which the above-described evaluation value is minimum, and uses the obtained (u, v) set as an inter-frame motion vector V. By sequentially shifting the position of the window area, the motion is obtained pixel by pixel or block by block (for example, 8 pixels×8 pixels).

FIG. 2 is referred to again. The temporal resolution upconverter 109 receives data on each of the R image $R_{LH}$ and the B image $B_{LH}$ taken by the first imaging section 103, data on the G image $G_{HL}$ taken by the second imaging section 104, and data on the motion vector V detected by the motion detection section 108, outputs $G_{HH}$ as a result of increasing the resolution of $G_{HL}$.

The resolution of $G_{HL}$ is increased by obtaining $G_{HH}$ which minimizes expression 3 below.

$$J = (H_T G_{HH} - G_{HL})^2 + \lambda_s (Q_s G_{HH})^2 + \lambda_m (Q_m G_{HH})^2 + \lambda_c (Q_c H_s G_{HH})^2, \quad \text{[Expression 3]}$$

where $G_{HH}$ and $G_{HL}$ represent vertical vectors having the pixels of the moving image as the elements, $H_T$ represents the matrix modeling the addition of light by long-time exposure, $\lambda_s$ represents the weight to the smoothness constraint, $Q_s$ represents the smoothness constraint, $\lambda_m$ represents the weight to the motion constraint, $Q_m$ represents the motion constraint, $\lambda_c$ represents the weight to the color correlation constraint, $H_s$ represents the matrix modeling the relationship between a high resolution image and a low resolution image, and $Q_c$ represents the color correlation constraint. The imaging conditions set for the second imaging section 104 by the control section 120 are reflected on at least $H_T$, $Q_s$, $Q_m$ and $Q_c$.

$G_{HH}$ which minimizes expression 3 means $G_{HH}$ which most satisfies the linear sum of the given constraining conditions. The left side of expression 3 is scalar. The process of deriving the right side will be described later.

The temporal resolution upconverter 109 obtains $G_{HH}$ which minimizes expression 3 based on expression 4 below.

$$\frac{\partial J}{\partial G_{HH}} = 2H_T^T(H_T G_{HH} - G_{HL}) + 2\lambda_s Q_s^T Q_s G_{HH} + \quad \text{[Expression 4]}$$

$$2\lambda_m Q_m^T Q_m G_{HH} + 2\lambda_c H_s^T Q_c^T Q_c H_s G_{HH} = 0$$

As a result, the temporal resolution upconverter 109 obtains $G_{HH}$ by solving the simultaneous equations represented by expression 5.

$$(H_T^T + \lambda_s Q_s^T Q_s + \lambda_m Q_m^T Q_m + \lambda_c H_s^T Q_c^T Q_c H_s)$$
$$G_{HH} = H_T^T G_{HL} \quad \text{[Expression 5]}$$

Expression 5 can be solved by an existing numerical value calculation method (method for solving simultaneous equations) such as conjugate gradient method, steepest descent method or the like.

The processing performed by the temporal resolution upconverter 109 for increasing the resolution of the input $G_{HL}$ by the above-described procedure to obtain $G_{HH}$ includes processing of increasing the number of frames, namely, processing of increasing the temporal resolution, and also processing of converting a blurred image to a clear (sharp) image. The moving image of the G component is taken by the second imaging section 104 with a high resolution, but a part thereof may be possibly blurred by the influence of the long-time exposure. Hence, the entire processing including the processing of sharpening the image is referred to as "increasing the resolution".

Hereinafter, the meaning and function of each term of expression 3 will be described in more detail.

The first term of expression 3 indicates the difference between the long-time exposure image expected from the $G_{HH}$ with the increased resolution and the actually observed long-time exposure image $G_{HL}$. This represents the temporal and spatial correspondence between $G_{HH}$ with the increased resolution and the long-time exposure image $G_{HL}$. Here, at $H_T$, the number of rows is smaller than the number of columns. This is also understood from that $G_{HL}$ is a long-time exposure image and has a lower frame rate than that of $G_{HH}$ (namely, the total number of pixels of $G_{HL}$ is smaller than that of $G_{HH}$). Therefore, if the left side only includes the first term, expression 3 is an ill-posed problem, by which the problem to be solved (namely, the simultaneous expressions) cannot be solved uniquely.

In order to change this ill-posed problem into a well-posed problem, the second and the other terms are added to the first term of expression 3. The second term of expression 3 indicates the characteristic generally fulfilled by the image, namely, the local smoothness between pixels located close to each other. Where the moving image is I(x, y, t), the local smoothness can be represented as:

$$\int \|\nabla^2 I(x, y, t)\|^2 dx\,dy\,dt = \quad \text{[Expression 6]}$$

$$\int \left\| \begin{pmatrix} \frac{\partial^2}{\partial x^2} I(x, y, t) \\ \frac{\partial^2}{\partial y^2} I(x, y, t) \\ \frac{\partial^2}{\partial t^2} I(x, y, t) \end{pmatrix} \right\|^2 dx\,dy\,dt$$

Here, the range of integration is the entire time-space occupied by the moving image. $\|\cdot\|$ in the integrand in expression 6 indicates the norm of the vector. The second term of expression 3 performs difference expansion of expression 6 and substitutes I with G to represent expression 6 in the form of the logical product of the matrix $Q_s$ and the vector $G_{HH}$.

The third term of expression 3 is the constraint on the motion in the image. Here, it is assumed that each point in the moving image moves without changing the brightness thereof. In the matrix $Q_m$ in the third term, only the elements relating to the pixels at the start point and the end point of the motion vector detected in the moving image are respectively 1 and −1. Therefore, $(Q_m G_{HH})^2$ is the total sum, in the entire moving image, of the squares of the residual between the start point and the end point of the motion vector.

The fourth term of expression 3 is the constraint on the local correlation among R, G and B. Like the local smoothness assumed for the second term of expression 3, local correlation (color correlation) among the pixel values of R, G and B is assumed for the fourth term.

Figures 3, 4:
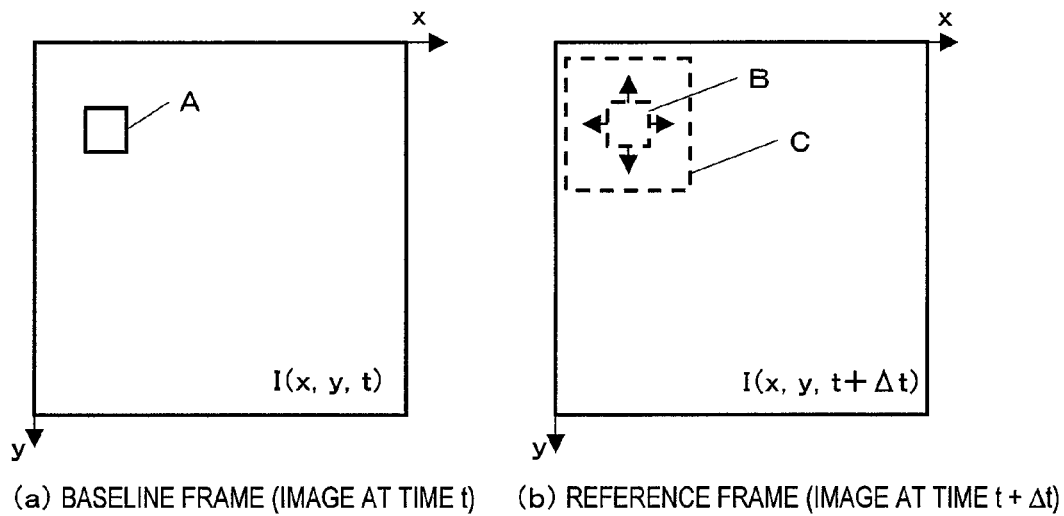
FIG. 4 shows a group of R, G and B pixels forming a color image of 2×2 pixels.

Here, for simplicity, the example shown in FIG. 4 is used for the explanation. FIG. 4 shows a group of R, G and B pixels which form one color image of 2×2 pixels. It is assumed that R, G and B are correlated to one another. Namely, it is assumed that the ratio among R, G and B is uniform in all the pixels. Thus, expression 7 holds.

$$\frac{G_1}{R_1} = \frac{G_2}{R_2} = \frac{G_3}{R_3} = \frac{G_4}{R_4} \qquad \text{[Expression 7]}$$

$$\frac{G_1}{B_1} = \frac{G_2}{B_2} = \frac{G_3}{B_3} = \frac{G_4}{B_4}$$

For selecting two out of each four ratios, there are $_4C_2{=}6$ combinations. Thus, expression 8 is obtained.

$G_1 R_2 - G_2 R_1 = 0$ $G_2 R_3 - G_3 R_2 = 0$ $G_3 R_4 - G_4 R_3 = 0$ $G_1 R_4 - G_4 R_1 = 0$ $G_1 R_3 - G_3 R_1 = 0$ $G_2 R_4 - G_4 R_2 = 0$ $G_1 B_2 - G_2 B_1 = 0$ $G_2 B_3 - G_3 B_2 = 0$ $G_3 B_4 - G_4 B_3 = 0$ $G_1 B_4 - G_4 B_1 = 0$ $G_1 B_3 - G_3 B_1 = 0$ $G_2 B_4 - G_4 B_2 = 0$ [Expression 8]

Expression 8 can be represented by a matrix and vector as expression 9.

$$\begin{pmatrix} R_2 & -R_1 & 0 & 0 \\ 0 & R_3 & -R_2 & 0 \\ 0 & 0 & R_4 & -R_3 \\ R_4 & 0 & 0 & -R_1 \\ R_3 & 0 & -R_1 & 0 \\ 0 & R_4 & 0 & -R_2 \\ B_2 & -B_1 & 0 & 0 \\ 0 & B_3 & -B_2 & 0 \\ 0 & 0 & B_4 & -B_3 \\ B_4 & 0 & 0 & -B_1 \\ B_3 & 0 & -B_1 & 0 \\ 0 & B_4 & 0 & -B_2 \end{pmatrix} \begin{pmatrix} G_1 \\ G_2 \\ G_3 \\ G_4 \end{pmatrix} = q \begin{pmatrix} G_1 \\ G_2 \\ G_3 \\ G_4 \end{pmatrix} = 0 \qquad \text{[Expression 9]}$$

Where the area of 2×2 pixels is considered as a local area, the correlation among R, G and B is evaluated by the norm of the left side of expression 9 (i.e., expression 10).

$$\left\| \begin{pmatrix} R_2 & -R_1 & 0 & 0 \\ 0 & R_3 & -R_2 & 0 \\ 0 & 0 & R_4 & -R_3 \\ R_4 & 0 & 0 & -R_1 \\ R_3 & 0 & -R_1 & 0 \\ 0 & R_4 & 0 & -R_2 \\ B_2 & -B_1 & 0 & 0 \\ 0 & B_3 & -B_2 & 0 \\ 0 & 0 & B_4 & -B_3 \\ B_4 & 0 & 0 & -B_1 \\ B_3 & 0 & -B_1 & 0 \\ 0 & B_4 & 0 & -B_2 \end{pmatrix} \begin{pmatrix} G_1 \\ G_2 \\ G_3 \\ G_4 \end{pmatrix} \right\|^2 = \qquad \text{[Expression 10]}$$

$$\left\| q \begin{pmatrix} G_1 \\ G_2 \\ G_3 \\ G_4 \end{pmatrix} \right\|^2 = (G_1 \ G_2 \ G_3 \ G_4) q^T q \begin{pmatrix} G_1 \\ G_2 \\ G_3 \\ G_4 \end{pmatrix}$$

Here, $q^T q$ can be represented by expression 11.

$$q^T q = \begin{pmatrix} R_2^2 + R_3^2 + R_4^2 + B_2^2 + B_3^2 + B_4^2 & -R_1 R_2 - B_1 B_2 & -R_1 R_3 - B_1 B_3 & -R_1 R_4 - B_1 B_4 \\ -R_1 R_2 - B_1 B_2 & R_1^2 + R_3^2 + R_4^2 + B_1^2 + B_3^2 + B_4^2 & -R_2 R_3 - B_2 B_3 & -R_2 R_4 - B_2 B_4 \\ -R_1 R_3 - B_1 B_3 & -R_2 R_3 - B_2 B_3 & R_1^2 + R_2^2 + R_4^2 + B_1^2 + B_2^2 + B_4^2 & -R_3 R_4 - B_3 B_4 \\ -R_1 R_4 - B_1 B_4 & -R_2 R_4 - B_2 B_4 & -R_3 R_4 - B_3 B_4 & R_1^2 + R_2^2 + R_3^2 + B_1^2 + B_2^2 + B_3^2 \end{pmatrix} \qquad \text{[Expression 11]}$$

Figure 5:
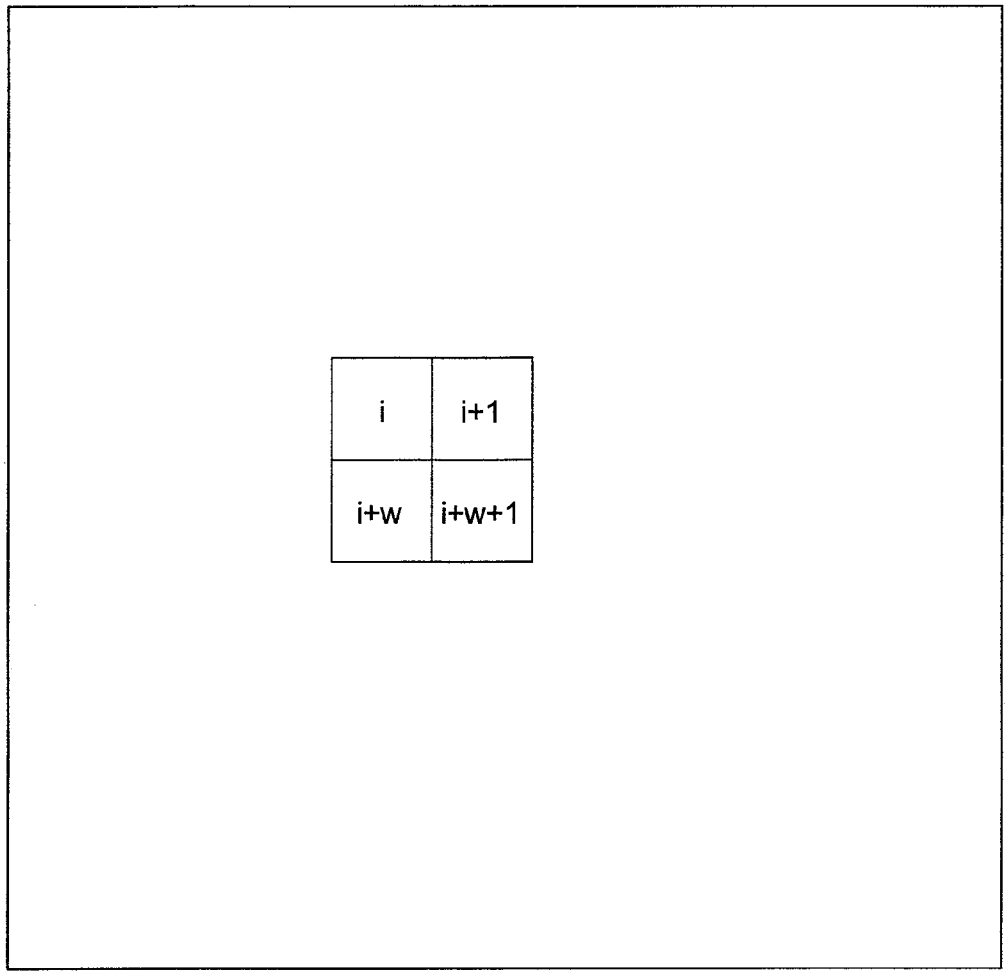
FIG. 5 shows pixels i, i+1, i+w, and i+w+1 which form a local area in a larger image.

Next, the area of 2×2 pixels will be considered as a local area in an image larger than 2×2 pixels. FIG. 5 shows pixels i, i+1, i+w and i+w+1 which form the local area in the larger image. As shown in FIG. 5, where the top left pixel in the local area is i'th pixel, the top right pixel is (i+1)'th pixel, the bottom left pixel is the (i+w)'th pixel (here, w is the number of pixels in the width direction of the image), and the bottom right pixel is the (i+w+1)'th pixel. Therefore, expression 11 is transformed as expression 12.

[Expression 12]

$$q_i^T q_i = \begin{pmatrix} R_{i+1}^2 + R_{i+w}^2 + R_{i+w+1}^2 + B_{i+1}^2 + B_{i+w}^2 + B_{i+w+1}^2 & -R_i R_{i+1} - B_i B_{i+1} & \cdots & -R_i R_{i+w} - B_i B_{i+w} & -R_i R_{i+w+1} - B_i B_{i+w+1} \\ -R_i R_{i+1} - B_i B_{i+1} & R_i^2 + R_{i+w}^2 + R_{i+w+1}^2 + B_i^2 + B_{i+w}^2 + B_{i+w+1}^2 & \cdots & -R_{i+1} R_{i+w} - B_{i+1} B_{i+w} & -R_{i+1} R_{i+w+1} - B_{i+1} B_{i+w+1} \\ \vdots & \vdots & \ddots & \vdots & \vdots \\ -R_i R_{i+w} - B_i B_{i+w} & -R_{i+1} R_{i+w} - B_{i+1} B_{i+w} & \cdots & R_i^2 + R_{i+1}^2 + R_{i+w+1}^2 + B_i^2 + B_{i+1}^2 + B_{i+w+1}^2 & -R_{i+w} R_{i+w+1} - B_{i+w} B_{i+w+1} \\ -R_i R_{i+w+1} - B_i B_{i+w+1} & -R_{i+1} R_{i+w+1} - B_{i+1} B_{i+w+1} & \cdots & -R_{i+w} R_{i+w+1} - B_{i+w} B_{i+w+1} & R_i^2 + R_{i+1}^2 + R_{i+w}^2 + B_i^2 + B_{i+1}^2 + B_{i+w}^2 \end{pmatrix}$$

$i$'th row, $(i+1)$'th row, $(i+w)$'th row, $(i+w+1)$'th row $i$'th column, $(i+1)$'th column, $(i+w)$'th column, $(i+w+1)$'th col $Q_c^T Q_c$ can be calculated for the entire image by first making all the elements of $Q_c^T Q_c$ zero and then while sequentially shifting the position of the top left pixel in the local area (namely, i), adding the local coefficient represented by expression 10 to the global coefficient matrix $Q_c^T Q_c$. In this process, the position in the local area may be shifted by one pixel vertically and horizontally so that the pixels overlap each other. Alternatively, the position in the local area may be shifted by two pixels vertically and horizontally so that the pixels are adjacent to each other without overlapping each other. In the latter case, artifact may be generated at the border of the local area, but substantially the same effect can be provided as that in the former case by a smaller amount of calculation.

By the above-described procedure, $H_T$, $Q_s$, $Q_m$ and $Q_c^T Q_c$ can be calculated. $H_s$ included in the fourth term of expression 3 is an operator for spatially decreasing the resolution of $G_{HH}$. This is used in order to impose the color correlation constraint described above between the medium area of $G_{HH}$ and $R_{LH}$, $B_{LH}$.

The value of each of the weights $\lambda_s$, $\lambda_m$ and $\lambda_c$ to the respective constraint is set so as to improve the quality of the image $G_{HH}$ to be generated. For example, one criterion for setting the values of the weights $\lambda_s$, $\lambda_m$ and $\lambda_c$ is whether, in expression 3, the magnitudes of the terms (the four terms including the first term) weighted by these parameters substantially match one another at the order level. Where the magnitudes of these four terms do not match at the order level, the term having a large value is dominant as the constraining condition and the term having a small value is not effective as the constraining condition.

By solving the simultaneous expressions of expression 5 regarding the observed image $G_{HL}$ using the matrices and the weights calculated as described above, $G_{HH}$ can be generated.

By weighting as in expression 1 in accordance with the correlation between R and B in the local area represented by expression 12, $G_{HH}$ which is visually more natural can be reproduced in accordance with the correlation between R and B.

[Expression 1]

$$q_i^T q_i = W$$

$$W = \begin{pmatrix} \ddots & & & & & & & \\ & R_{i+1}^2 + R_{i+w}^2 + R_{i+w+1}^2 + B_{i+1}^2 + B_{i+w}^2 + B_{i+w+1}^2 & \cdots & -R_i R_{i+1} - B_i B_{i+1} & & -R_i R_{i+w} - B_i B_{i+w} & & -R_i R_{i+w+1} - B_i B_{i+w+1} \\ & \vdots & \ddots & \vdots & & \vdots & & \vdots \\ & -R_i R_{i+1} - B_i B_{i+1} & \cdots & R_i^2 + R_{i+w}^2 + R_{i+w+1}^2 + B_i^2 + B_{i+w}^2 + B_{i+w+1}^2 & \cdots & -R_{i+1} R_{i+w} - B_{i+1} B_{i+w} & \cdots & -R_{i+1} R_{i+w+1} - B_{i+1} B_{i+w+1} \\ & & & \vdots & \ddots & \vdots & & \vdots \\ & -R_i R_{i+w} - B_i B_{i+w} & \cdots & -R_{i+1} R_{i+w} - B_{i+1} B_{i+w} & \cdots & R_i^2 + R_{i+1}^2 + R_{i+w+1}^2 + B_i^2 + B_{i+1}^2 + B_{i+w+1}^2 & \cdots & -R_{i+w} R_{i+w+1} - B_{i+w} B_{i+w+1} \\ & \vdots & & \vdots & & \vdots & \ddots & \vdots \\ & -R_i R_{i+w+1} - B_i B_{i+w+1} & \cdots & -R_{i+1} R_{i+w+1} - B_{i+1} B_{i+w+1} & \cdots & -R_{i+w} R_{i+w+1} - B_{i+w} B_{i+w+1} & \cdots & R_i^2 + R_{i+1}^2 + R_{i+w}^2 + B_i^2 + B_{i+1}^2 + B_{i+w}^2 \\ & & & & & & & \ddots \end{pmatrix}$$

with rows labeled $i$'th row, $(i+1)$'th row, $(i+w)$'th row, $(i+w+1)$'th row and columns labeled $i$'th column, $(i+1)$'th column, $(i+w)$'th column, $(i+w+1)$'th column.

Figure 6:
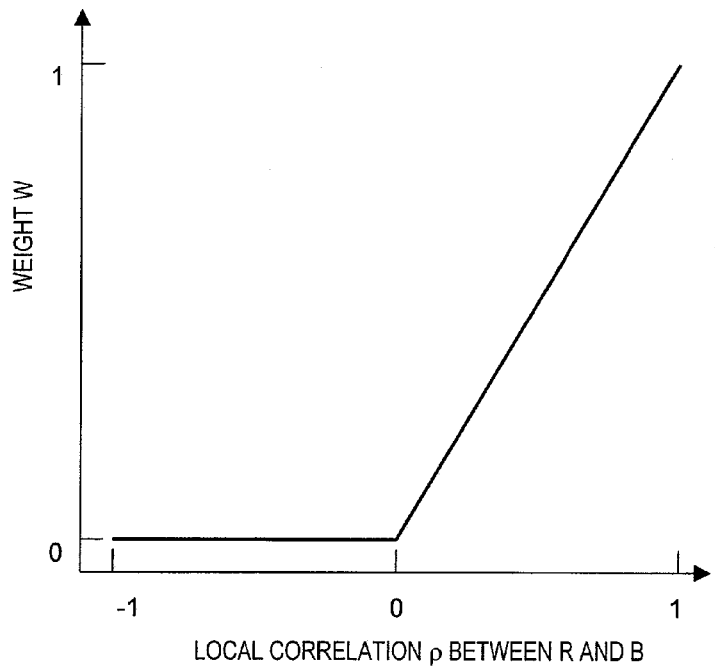
FIG. 6 shows the relationship between the local correlation ρ between R and B with the weight W.

Here, the distribution of weight W is set such that the weight W has a value of 0 to 1 in accordance with the correlation value between R and B in the local area (−1 to 1). For example, FIG. 6 shows the relationship of the local correlation ρ between R and B against the weight W. Regarding the area of 2×2 pixels shown in FIG. 4, the local correlation ρ between R and B is represented by expression 14.

$$\rho = \frac{\sum_{i=1}^{4}(R_i - \overline{R})(B_i - \overline{B})}{\sqrt{\sum_{i=1}^{4}(R_i - \overline{R})^2}\sqrt{\sum_{i=1}^{4}(B_i - \overline{B})^2}}$$ [Expression 14]

Once the local correlation ρ between R and B is obtained, the weight W is determined based on the relationship shown in FIG. 6.

The local correlation between R and B does not need to be obtained for an area of 2×2 pixels, and may be obtained for a larger rectangular area of 3 pixels×3 pixels, 4 pixels×4 pixels, 5 pixels×5 pixels or the like. The local correlation between R and B may be obtained for a circular area or a polygonal area having four or more sides, or a weight which puts importance on an area in the vicinity of the pixel of interest may be used for calculation by the Gaussian function or the like. By using such a calculation method, the calculation of the correlation value can be made more isotropic for the pattern of the image.

In this embodiment, the constraint $Q_c$ on the color correlation is calculated using the R, G and B levels themselves. Substantially the same effect can be provided by using the R, G and B gradients instead of the levels themselves. Such an example will be described below.

The following is known regarding a motion in a moving image: assuming that the brightness is the same between corresponding points, the relationship of optical flow approximately holds regarding a motion vector (u, v) in the image. The optical flow of each of R, G and B is represented by expression 15.

$$\frac{\partial R}{\partial x}u + \frac{\partial R}{\partial y}v + \frac{\partial R}{\partial t} = 0$$ [Expression 15]

$$\frac{\partial G}{\partial x}u + \frac{\partial G}{\partial y}v + \frac{\partial G}{\partial t} = 0$$

$$\frac{\partial B}{\partial x}u + \frac{\partial B}{\partial y}v + \frac{\partial B}{\partial t} = 0$$

Here, assuming that the motion vector (u, v) in the image is the same among R, G and B, expression 16 is obtained.

$$\frac{\partial R}{\partial x}\frac{\partial G}{\partial y} - \frac{\partial R}{\partial y}\frac{\partial G}{\partial x} = 0$$ [Expression 16]

$$\frac{\partial R}{\partial y}\frac{\partial G}{\partial t} - \frac{\partial R}{\partial t}\frac{\partial G}{\partial y} = 0$$

$$\frac{\partial R}{\partial t}\frac{\partial G}{\partial x} - \frac{\partial R}{\partial x}\frac{\partial G}{\partial t} = 0$$

$$\frac{\partial B}{\partial x}\frac{\partial G}{\partial y} - \frac{\partial B}{\partial y}\frac{\partial G}{\partial x} = 0$$

$$\frac{\partial B}{\partial y}\frac{\partial G}{\partial t} - \frac{\partial B}{\partial t}\frac{\partial G}{\partial y} = 0$$

$$\frac{\partial B}{\partial t}\frac{\partial G}{\partial x} - \frac{\partial B}{\partial x}\frac{\partial G}{\partial t} = 0$$

In expression 16, R and G are considered for the value of one pixel. However, ∂/∂x and ∂/∂y are represented as matrices by difference expansion. Hence, where R and G are considered as a vector, expression 17 is obtained for the entirety of the moving image.

$$\left(\frac{\partial}{\partial x}R\frac{\partial}{\partial y} - \frac{\partial}{\partial y}R\frac{\partial}{\partial x}\right)G = 0$$ [Expression 17]

$$\left(\frac{\partial}{\partial y}R\frac{\partial}{\partial t} - \frac{\partial}{\partial t}R\frac{\partial}{\partial y}\right)G = 0$$

$$\left(\frac{\partial}{\partial t}R\frac{\partial}{\partial x} - \frac{\partial}{\partial x}R\frac{\partial}{\partial t}\right)G = 0$$

$$\left(\frac{\partial}{\partial x}B\frac{\partial}{\partial y} - \frac{\partial}{\partial y}B\frac{\partial}{\partial x}\right)G = 0$$

$$\left(\frac{\partial}{\partial y}B\frac{\partial}{\partial t} - \frac{\partial}{\partial t}B\frac{\partial}{\partial y}\right)G = 0$$

$$\left(\frac{\partial}{\partial t}B\frac{\partial}{\partial x} - \frac{\partial}{\partial x}B\frac{\partial}{\partial t}\right)G = 0$$

In order to allow as many expressions as possible of expression 17 to hold at the same time for the entire image, $G_{HH}$ which minimizes expression 18 is obtained.

$$\left\|\left(\frac{\partial}{\partial x}R_{LH}\frac{\partial}{\partial y} - \frac{\partial}{\partial y}R_{LH}\frac{\partial}{\partial x}\right)H_s G_{HH}\right\|^2 +$$ [Expression 18]

$$\left\|\left(\frac{\partial}{\partial y}R_{LH}\frac{\partial}{\partial t} - \frac{\partial}{\partial t}R_{LH}\frac{\partial}{\partial y}\right)H_s G_{HH}\right\|^2 +$$

$$\left\|\left(\frac{\partial}{\partial t}R_{LH}\frac{\partial}{\partial x} - \frac{\partial}{\partial x}R_{LH}\frac{\partial}{\partial t}\right)H_s G_{HH}\right\|^2 +$$

$$\left\|\left(\frac{\partial}{\partial x}B_{LH}\frac{\partial}{\partial y} - \frac{\partial}{\partial y}B_{LH}\frac{\partial}{\partial x}\right)H_s G_{HH}\right\|^2 +$$

$$\left\|\left(\frac{\partial}{\partial y}B_{LH}\frac{\partial}{\partial t} - \frac{\partial}{\partial t}B_{LH}\frac{\partial}{\partial y}\right)H_s G_{HH}\right\|^2 +$$

$$\left\|\left(\frac{\partial}{\partial t}B_{LH}\frac{\partial}{\partial x} - \frac{\partial}{\partial x}B_{LH}\frac{\partial}{\partial t}\right)H_s G_{HH}\right\|^2$$

$G_{HH}$ which minimizes expression 18 can be obtained by finding $G_{HH}$ which makes zero the expression obtained by performing partial differentiation on expression 18 with $G_{HH}$. Thus, expression 19 is obtained.

$$\left(\left\|\left(\frac{\partial}{\partial x}R_{LH}\frac{\partial}{\partial y} - \frac{\partial}{\partial y}R_{LH}\frac{\partial}{\partial x}\right)H_s\right\|^2 + \right.$$ [Expression 19]

$$\left\|\left(\frac{\partial}{\partial y}R_{LH}\frac{\partial}{\partial t} - \frac{\partial}{\partial t}R_{LH}\frac{\partial}{\partial y}\right)H_s\right\|^2 +$$

$$\left\|\left(\frac{\partial}{\partial t}R_{LH}\frac{\partial}{\partial x} - \frac{\partial}{\partial x}R_{LH}\frac{\partial}{\partial t}\right)H_s\right\|^2 +$$

$$\left\|\left(\frac{\partial}{\partial x}B_{LH}\frac{\partial}{\partial y} - \frac{\partial}{\partial y}B_{LH}\frac{\partial}{\partial x}\right)H_s\right\|^2 +$$

$$\left\|\left(\frac{\partial}{\partial y}B_{LH}\frac{\partial}{\partial t} - \frac{\partial}{\partial t}B_{LH}\frac{\partial}{\partial y}\right)H_s\right\|^2 +$$

$$\left.\left\|\left(\frac{\partial}{\partial t}B_{LH}\frac{\partial}{\partial x} - \frac{\partial}{\partial x}B_{LH}\frac{\partial}{\partial t}\right)H_s\right\|^2\right)G_{HH} = 0$$

By comparing expression 19 and the fourth term of expression 3, expression 20 is obtained.

$$Q_c = \left(\frac{\partial}{\partial x}R_{LH}\frac{\partial}{\partial y} - \frac{\partial}{\partial y}R_{LH}\frac{\partial}{\partial x}\right) + \\ \left(\frac{\partial}{\partial y}R_{LH}\frac{\partial}{\partial t} - \frac{\partial}{\partial t}R_{LH}\frac{\partial}{\partial y}\right) + \\ \left(\frac{\partial}{\partial t}R_{LH}\frac{\partial}{\partial x} - \frac{\partial}{\partial x}R_{LH}\frac{\partial}{\partial t}\right) + \\ \left(\frac{\partial}{\partial x}B_{LH}\frac{\partial}{\partial y} - \frac{\partial}{\partial y}B_{LH}\frac{\partial}{\partial x}\right) + \\ \left(\frac{\partial}{\partial y}B_{LH}\frac{\partial}{\partial t} - \frac{\partial}{\partial t}B_{LH}\frac{\partial}{\partial y}\right) + \left(\frac{\partial}{\partial t}B_{LH}\frac{\partial}{\partial x} - \frac{\partial}{\partial x}B_{LH}\frac{\partial}{\partial t}\right)$$

[Expression 20]

Figure 19:
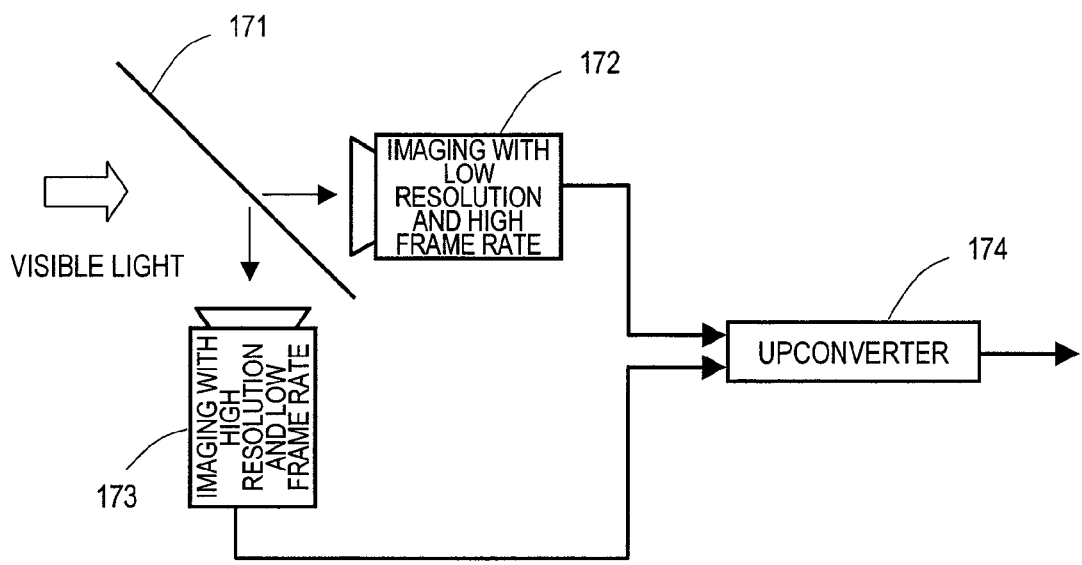
FIG. 19 shows a structure of a conventional imaging device.
Figure 20:
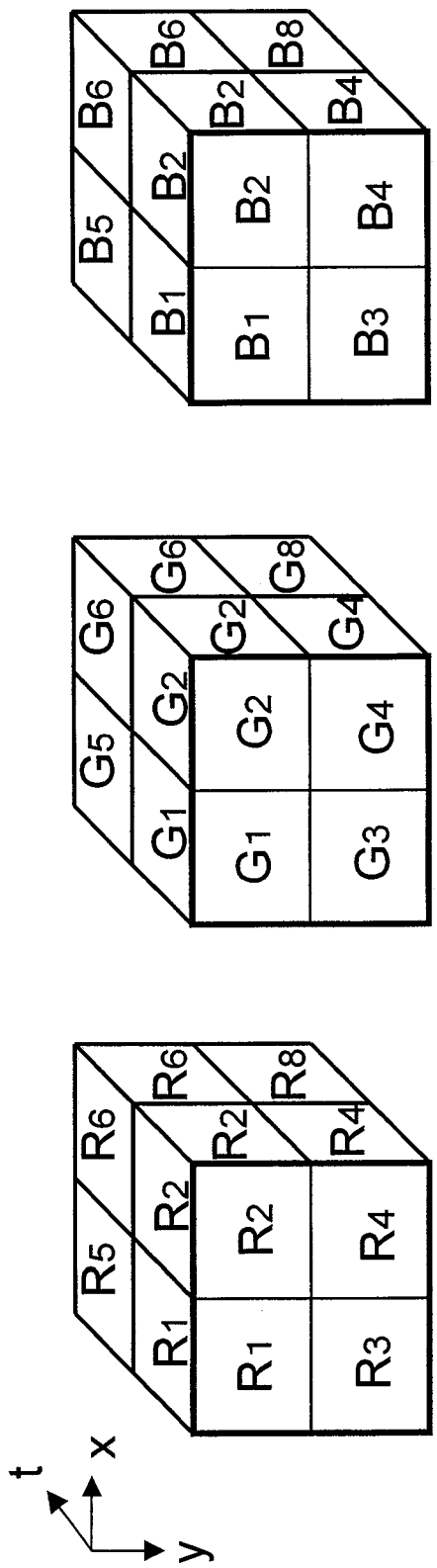
FIG. 20 shows a group of R, G and B pixels forming a color image of 2×2×2 pixels.

The local correlation is not limited to being considered regarding the spatial vicinity area as described above, but may be considered regarding the temporal and spatial vicinity, needless to say. For example, a vicinity area as shown in FIG. 20 may be considered, in which case a more stable effect can be provided. FIG. 19 shows a group of R, G and B pixels which form a color image of 2×2×2 pixels. Here, it is assumed that R, G and B are correlated to one another. Namely, it is assumed that the ratio among R, G and B is uniform in all the pixels. Thus, expression 21 holds.

$$\frac{G_1}{R_1} = \frac{G_2}{R_2} = \frac{G_3}{R_3} = \frac{G_4}{R_4} = \frac{G_5}{R_5} = \frac{G_6}{R_6} = \frac{G_7}{R_7} = \frac{G_8}{R_8}$$

$$\frac{G_1}{B_1} = \frac{G_2}{B_2} = \frac{G_3}{B_3} = \frac{G_4}{B_4} = \frac{G_5}{B_5} = \frac{G_6}{B_6} = \frac{G_7}{B_7} = \frac{G_8}{B_8}$$

[Expression 21]

For selecting two out of each eight ratios, there are $_8C_2 = 28$ combinations. Thus, expressions 22 and 23 are obtained.

$G_1R_2 - G_2R_1 = 0$ $G_1R_3 - G_3R_1 = 0$ $G_1R_4 - G_4R_1 = 0$ $G_1R_5 - G_5R_1 = 0$ $G_1R_6 - G_6R_1 = 0$ $G_1R_7 - G_7R_1 = 0$ $G_1R_8 - G_8R_1 = 0$ $G_2R_3 - G_3R_2 = 0$ $G_2R_4 - G_4R_2 = 0$ $G_2R_5 - G_5R_2 = 0$ $G_2R_6 - G_6R_2 = 0$ $G_2R_7 - G_7R_2 = 0$ $G_2R_8 - G_8R_2 = 0$ $G_3R_4 - G_4R_3 = 0$ $G_3R_5 - G_5R_3 = 0$ $G_3R_6 - G_6R_3 = 0$ $G_3R_7 - G_7R_3 = 0$ $G_3R_8 - G_8R_3 = 0$ $G_4R_5 - G_5R_4 = 0$ $G_4R_6 - G_6R_4 = 0$ $G_4R_7 - G_7R_4 = 0$ $G_4R_8 - G_8R_4 = 0$ $G_5R_6 - G_6R_5 = 0$ $G_5R_7 - G_7R_5 = 0$ $G_5R_8 - G_8R_5 = 0$ $G_6R_7 - G_7R_6 = 0$ $G_6R_8 - G_8R_6 = 0$ $G_7R_8 - G_8R_7 = 0$

[Expression 22]

$G_1B_2 - G_2B_1 = 0$ $G_1B_3 - G_3B_1 = 0$ $G_1B_4 - G_4B_1 = 0$ $G_1B_5 - G_5B_1 = 0$ $G_1B_6 - G_6B_1 = 0$ $G_1B_7 - G_7B_1 = 0$ $G_1B_8 - G_8B_1 = 0$ $G_2B_3 - G_3B_2 = 0$ $G_2B_4 - G_4B_2 = 0$ $G_2B_5 - G_5B_2 = 0$ $G_2B_6 - G_6B_2 = 0$ $G_2B_7 - G_7B_2 = 0$ $G_2B_8 - G_8B_2 = 0$ $G_3B_4 - G_4B_3 = 0$ $G_3B_5 - G_5B_3 = 0$ $G_3B_6 - G_6B_3 = 0$ $G_3B_7 - G_7B_3 = 0$ $G_3B_8 - G_8B_3 = 0$ $G_4B_5 - G_5B_4 = 0$ $G_4B_6 - G_6B_4 = 0$ $G_4B_7 - G_7B_4 = 0$ $G_4B_8 - G_8B_4 = 0$ $G_5B_6 - G_6B_5 = 0$ $G_5B_7 - G_7B_5 = 0$ $G_5B_8 - G_8B_5 = 0$ $G_6B_7 - G_7B_6 = 0$ $G_6B_8 - G_8B_6 = 0$ $G_7B_8 - G_8B_7 = 0$

[Expression 23]

Expressions 22 and 23 are represented by matrices and vectors as expressions 24 and 25.

$$\begin{pmatrix} R_2 & R_1 & 0 & 0 & 0 & 0 & 0 & 0 \\ R_3 & 0 & R_1 & 0 & 0 & 0 & 0 & 0 \\ R_4 & 0 & 0 & R_1 & 0 & 0 & 0 & 0 \\ R_5 & 0 & 0 & 0 & R_1 & 0 & 0 & 0 \\ R_6 & 0 & 0 & 0 & 0 & R_1 & 0 & 0 \\ R_7 & 0 & 0 & 0 & 0 & 0 & R_1 & 0 \\ R_8 & 0 & 0 & 0 & 0 & 0 & 0 & R_1 \\ 0 & R_3 & R_2 & 0 & 0 & 0 & 0 & 0 \\ 0 & R_4 & 0 & R_2 & 0 & 0 & 0 & 0 \\ 0 & R_5 & 0 & 0 & R_2 & 0 & 0 & 0 \\ 0 & R_6 & 0 & 0 & 0 & R_2 & 0 & 0 \\ 0 & R_7 & 0 & 0 & 0 & 0 & R_2 & 0 \\ 0 & R_8 & 0 & 0 & 0 & 0 & 0 & R_2 \\ 0 & 0 & R_4 & R_3 & 0 & 0 & 0 & 0 \\ 0 & 0 & R_5 & 0 & R_3 & 0 & 0 & 0 \\ 0 & 0 & R_6 & 0 & 0 & R_3 & 0 & 0 \\ 0 & 0 & R_7 & 0 & 0 & 0 & R_3 & 0 \\ 0 & 0 & R_8 & 0 & 0 & 0 & 0 & R_3 \\ 0 & 0 & 0 & R_5 & R_4 & 0 & 0 & 0 \\ 0 & 0 & 0 & R_6 & 0 & R_4 & 0 & 0 \\ 0 & 0 & 0 & R_7 & 0 & 0 & R_4 & 0 \\ 0 & 0 & 0 & R_8 & 0 & 0 & 0 & R_4 \\ 0 & 0 & 0 & 0 & R_6 & R_5 & 0 & 0 \\ 0 & 0 & 0 & 0 & R_7 & 0 & R_5 & 0 \\ 0 & 0 & 0 & 0 & R_8 & 0 & 0 & R_5 \\ 0 & 0 & 0 & 0 & 0 & R_7 & R_6 & 0 \\ 0 & 0 & 0 & 0 & 0 & R_8 & 0 & R_6 \\ 0 & 0 & 0 & 0 & 0 & 0 & R_8 & R_7 \end{pmatrix} \begin{pmatrix} G_1 \\ G_2 \\ G_3 \\ G_4 \\ G_5 \\ G_6 \\ G_7 \\ G_8 \end{pmatrix} = q_R \begin{pmatrix} G_1 \\ G_2 \\ G_3 \\ G_4 \\ G_5 \\ G_6 \\ G_7 \\ G_8 \end{pmatrix} = 0$$

[Expression 24]

$$\begin{pmatrix} B_2 & B_1 & 0 & 0 & 0 & 0 & 0 & 0 \\ B_3 & 0 & B_1 & 0 & 0 & 0 & 0 & 0 \\ B_4 & 0 & 0 & B_1 & 0 & 0 & 0 & 0 \\ B_5 & 0 & 0 & 0 & B_1 & 0 & 0 & 0 \\ B_6 & 0 & 0 & 0 & 0 & B_1 & 0 & 0 \\ B_7 & 0 & 0 & 0 & 0 & 0 & B_1 & 0 \\ B_8 & 0 & 0 & 0 & 0 & 0 & 0 & B_1 \\ 0 & B_3 & B_2 & 0 & 0 & 0 & 0 & 0 \\ 0 & B_4 & 0 & B_2 & 0 & 0 & 0 & 0 \\ 0 & B_5 & 0 & 0 & B_2 & 0 & 0 & 0 \\ 0 & B_6 & 0 & 0 & 0 & B_2 & 0 & 0 \\ 0 & B_7 & 0 & 0 & 0 & 0 & B_2 & 0 \\ 0 & B_8 & 0 & 0 & 0 & 0 & 0 & B_2 \\ 0 & 0 & B_4 & B_3 & 0 & 0 & 0 & 0 \\ 0 & 0 & B_5 & 0 & B_3 & 0 & 0 & 0 \\ 0 & 0 & B_6 & 0 & 0 & B_3 & 0 & 0 \\ 0 & 0 & B_7 & 0 & 0 & 0 & B_3 & 0 \\ 0 & 0 & B_8 & 0 & 0 & 0 & 0 & B_3 \\ 0 & 0 & 0 & B_5 & B_4 & 0 & 0 & 0 \\ 0 & 0 & 0 & B_6 & 0 & B_4 & 0 & 0 \\ 0 & 0 & 0 & B_7 & 0 & 0 & B_4 & 0 \\ 0 & 0 & 0 & B_8 & 0 & 0 & 0 & B_4 \\ 0 & 0 & 0 & 0 & B_6 & B_5 & 0 & 0 \\ 0 & 0 & 0 & 0 & B_7 & 0 & B_5 & 0 \\ 0 & 0 & 0 & 0 & B_8 & 0 & 0 & B_5 \\ 0 & 0 & 0 & 0 & 0 & B_7 & B_6 & 0 \\ 0 & 0 & 0 & 0 & 0 & B_8 & 0 & B_6 \\ 0 & 0 & 0 & 0 & 0 & 0 & B_8 & B_7 \end{pmatrix} \begin{pmatrix} G_1 \\ G_2 \\ G_3 \\ G_4 \\ G_5 \\ G_6 \\ G_7 \\ G_8 \end{pmatrix} = q_B \begin{pmatrix} G_1 \\ G_2 \\ G_3 \\ G_4 \\ G_5 \\ G_6 \\ G_7 \\ G_8 \end{pmatrix} = 0$$

[Expression 25]

From expressions 24 and 25, the following relationship is obtained.

$$q\begin{pmatrix}G_1\\G_2\\G_3\\G_4\\G_5\\G_6\\G_7\\G_8\end{pmatrix} = \begin{pmatrix}q_R\\q_B\end{pmatrix}\begin{pmatrix}G_1\\G_2\\G_3\\G_4\\G_5\\G_6\\G_7\\G_8\end{pmatrix} = 0 \quad \text{[Expression 26]}$$

In the case where the area of 2×2×2 pixels is considered as a local area, the correlation among R, G and B can be evaluated by the norm of the left side of expression 25 (i.e., expression 27).

$$\left\| q\begin{pmatrix}G_1\\G_2\\G_3\\G_4\\G_5\\G_6\\G_7\\G_8\end{pmatrix} \right\|^2 = (G_1\ G_2\ G_3\ G_4\ G_5\ G_6\ G_7\ G_8)q^T q\begin{pmatrix}G_1\\G_2\\G_3\\G_4\\G_5\\G_6\\G_7\\G_8\end{pmatrix} \quad \text{[Expression 27]}$$

In the case where the area of 2×2×2 pixels is considered as a local area in an image larger than 2×2×2 pixels, the local relationship is sequentially added to the global relational expression like in the case where the spatial vicinity area of 2×2 pixels is considered above. As a result, the global relational expression can be obtained.

Figure 21:
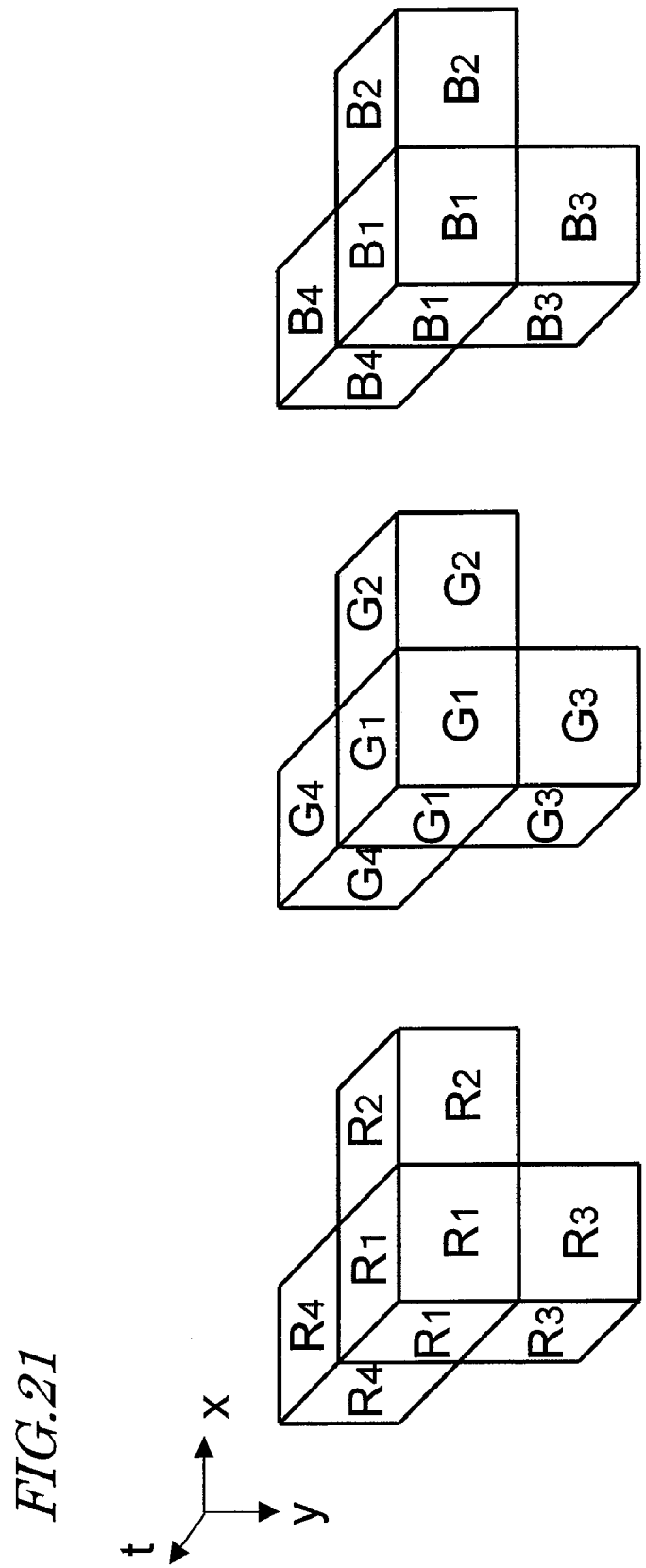
FIG. 21 shows a group of R, G and B pixels forming a color image of a pixel of interest and three pixels in the vicinity thereof.

Instead of considering the local correlation regarding the vicinity area of 2×2×2 pixels, local correlation may be considered regarding only four pixels as shown in FIG. 21, which include the pixel of interest and three pixels adjacent thereto temporally and spatially. In this case, substantially the same effect can be provided with a smaller amount of calculation than considering the local correlation regarding the vicinity area of 2×2×2 pixels.

In the case where an optical flow (motion vector field) is accurately obtained by assuming a local correlation in a direction of the optical flow, i.e., in the direction of the motion vector instead of by considering the local correlation regarding the vicinity area in the temporal direction as described above, a more stable effect can be provided. Moreover, where the motion vector is obtained with a sub pixel precision, the motion information of the sub pixel precision can be effectively used by performing weighting using a value of the motion vector which is lower than the decimal point.

Regarding expression 3 described above, the constraining conditions of the first through fourth terms of the right side do not need to be used at the same time. The following modifications may be used. Namely, only the first and second terms of expression 1 may be used as:

$$J = (H_T G_{HH} - G_{HL})^2 + \lambda_s(Q_s G_{HH})^2 \quad \text{[Expression 28]}$$

Alternatively, expression 29 based on only the first and fourth terms of expression 3 may be used.

$$J = (H_T G_{HH} - G_{HL})^2 + \lambda_c(Q_c H_s G_{HH})^2 \quad \text{[Expression 29]}$$

Alternatively, expression 30 based on only the first, second and third terms of expression 3 may be used.

$$J = (H_T G_{HH} - G_{HL})^2 + \lambda_s(Q_s G_{HH})^2 + \lambda_m(Q_m G_{HH})^2 \quad \text{[Expression 30]}$$

Alternatively, expression 31 based on only the first, second and fourth terms of expression 3 may be used.

$$J = (H_T G_{HH} - G_{HL})^2 + \lambda_s(Q_s G_{HH})^2 + \lambda_c(Q_c H_s G_{HH})^2 \quad \text{[Expression 31]}$$

Using any of these modifications, the resolution of the G component can be increased with a smaller amount of calculation than performing calculations by expression 1 using all the constraining conditions of all the four terms of expression 3. Note, however, that use of any of these modifications means alleviating the constraining conditions and so the level of the resolution of the generated image may be sensed slightly lower.

For a scene for which motion detection is difficult, the processing of increasing the resolution is performed using an expression which does not use the result of motion detection (expression 28, 29 or 31). Thus, the generation of artifact (disturbance of image, noise) caused to the quality of the output image by a wrong detection of motion can be suppressed. Whether the motion detection from a scene is difficult or not can be determined based on (a) the difference in the results of motion detections performed in temporal bidirections or (b) the minimum value in the search range of the evaluation value at the time of motion detection represented by expression 1 or 2.

In the former case (a), assuming that the motion detection result in the forward temporal direction at (x, y) in the image in the baseline frame is (u, v), the determination is made as follows. After the forward direction motion detection, motion detection is performed in the reverse direction based on the reference frame at the time of the forward direction motion detection. When the motion detection result at (x+u, y+v) is (−u, −v), the motion detection results in both directions are consistent and reliable. By contrast, when the motion detection result is not (−u, −v), for example, when the motion detection result is different from (−u, −v) by a certain threshold value or greater, it can be determined that the motion detection is difficult.

Similarly in the latter case (b), when the difference from the minimum value in the search range of the evaluation value at the time of motion detection performed using SSD or SAD is, for example, a predetermined threshold value or greater, it can be determined that the motion detection is difficult.

For a scene with no color correlation, expression 28 or 30 is usable. When the weighting method represented by expression 13 is used for a scene with no color correlation, the weight is decreased. Therefore, in such a case, expression 30 is automatically used with no specific operation.

FIG. 1 will be referred to again. The upconverter 107 for R and B uses the moving image of the G component having the resolution thereof increased by the upconverter 106 for G to increase the resolutions of the moving images of R and B components taken by the first imaging section 103 with the imaging conditions of a short-time exposure, a low resolution and a high frame rate.

Hereinafter, with reference to FIG. 7, processing of increasing the resolutions of the moving images of R and B components will be described in detail.

Figure 7:
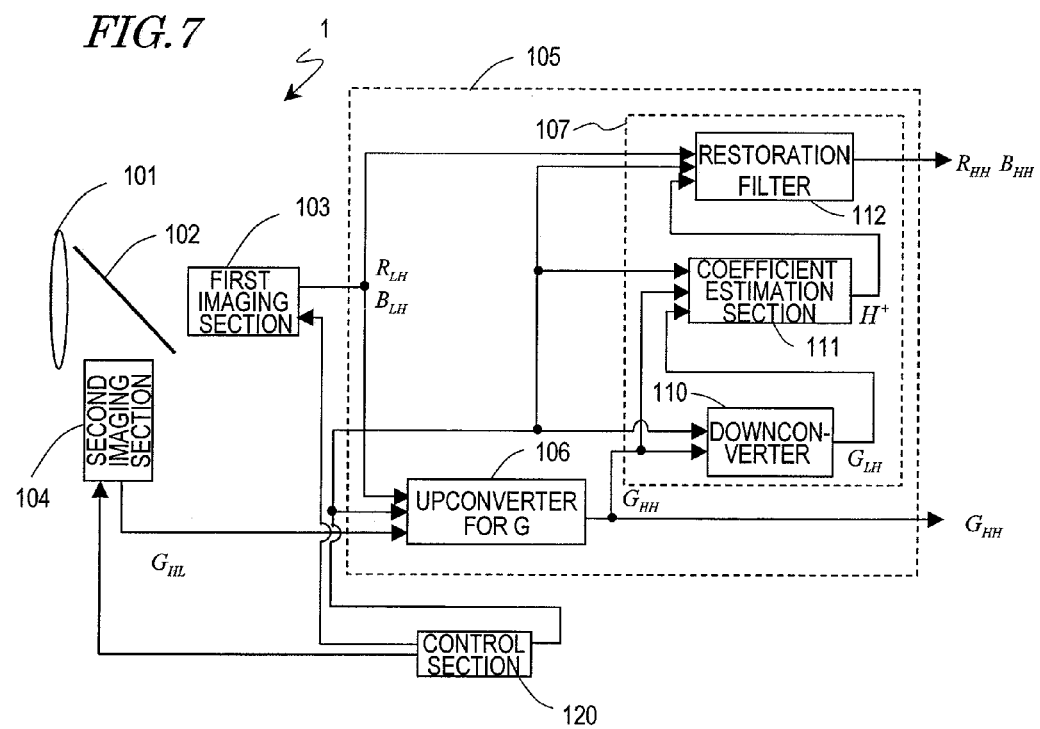
FIG. 7 shows a structure of an upconverter 107 for R and B in more detail.

FIG. 7 shows the structure of the upconverter 107 for R and B in more detail. In FIG. 7, elements common to those in the imaging and processing device shown in FIG. 1 bear identical reference numerals thereto and descriptions thereof will be omitted.

The upconverter 107 for R and B includes a downconverter 110, a coefficient estimation section 111 and a restoration filter 112.

The downconverter 110 spatially decreases the resolution of the G component ($G_{HH}$) having the resolution thereof increased by the upconverter 106 for G and outputs $G_{LH}$. The coefficient estimation section 111 estimates a filter coefficient of the restoration filter 112 (restoration filter H+) from $G_{HH}$ and $G_{LH}$. As the restoration filter 112, a known filter such as a Wiener filter, a general reverse filter or the like is usable. Such a restoration filter estimates a high resolution side signal from a low resolution signal, using the relationship between $G_{HH}$ and $G_{LH}$. The restoration filter 112 restores $R_{HH}$ and $B_{HH}$ from $R_{LH}$ and $B_{LH}$, using the filter coefficient estimated by the coefficient estimation section 111.

The processing performed by the upconverter 107 for R and G for increasing the resolutions of R and B is not limited to the above-described, so-called reconstruction type processing, and may be any other type of resolution increasing processing. The resolution increasing processing in another example will be described, hereinafter.

Figure 8:
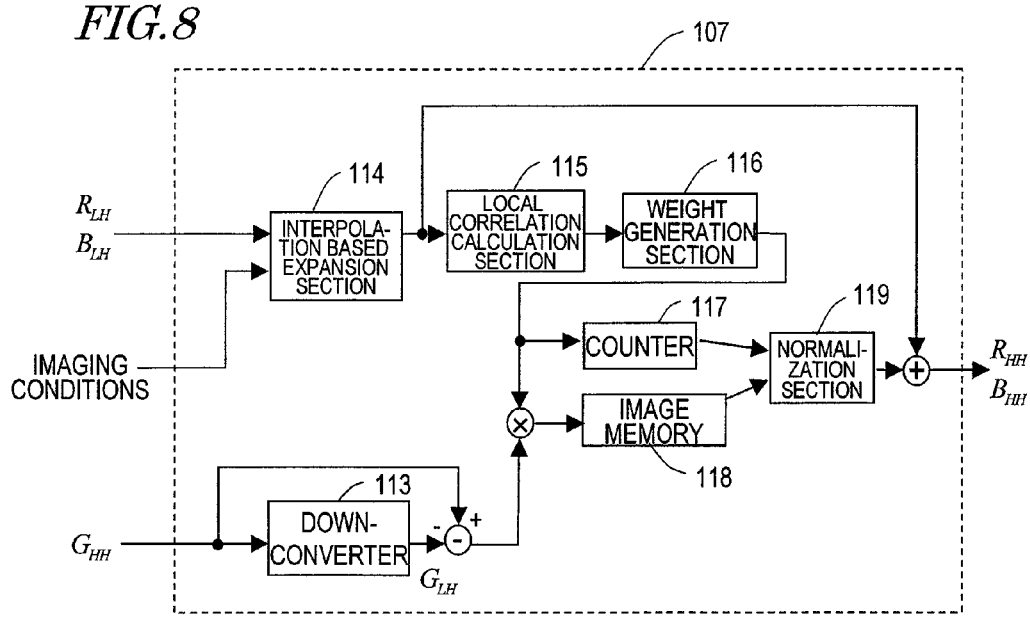
FIG. 8 shows a structure of an upconverter 107 for R and B in another example in detail.

FIG. 8 shows a structure of an upconverter 107 for R and G in another example in detail. Here, the upconverter 107 for R and G increases the resolutions of the R component and the B component by superimposing a high frequency component of G on the R component and the B component, which have been processed with interpolation based expansion, in accordance with the correlation between R and B.

The upconverter 107 for R and G shown in FIG. 8 includes a downconverter 113, an interpolation based expansion section 114, a local correlation calculation section 115, a weight generation section 116, a counter 117, an image memory 118, and a normalization section 119.

The upconverter 107 for R and G performs processing in units of frames which form a moving image. First, at the beginning of each frame, the content of the counter 117 and the content of the image memory 118 are cleared by filling the counter 117 and the image memory 118 with zeros.

The downconverter 113 spatially decreases the resolution of the G component ($G_{HH}$) having the resolution thereof increased by the upconverter 106 for G and outputs $G_{LH}$.

The interpolation based expansion section 114 receives $R_{LH}$ and $B_{LH}$ taken with a low resolution and a high frame rate and the imaging conditions, and performs interpolation based expansion on $R_{LH}$ and $B_{LH}$ such that $R_{LH}$ and $B_{LH}$ have the same number of pixels as that of $G_{HH}$.

The local correlation calculation section 115 calculates a local correlation value between $R_{LH}$ and $B_{LH}$ in a local area of about 2×2 pixels or 3×3 pixels. For calculating the local correlation value of an area of 2×2 pixels, the local correlation calculation section 115 can use, for example, expression 14.

Figure 9:
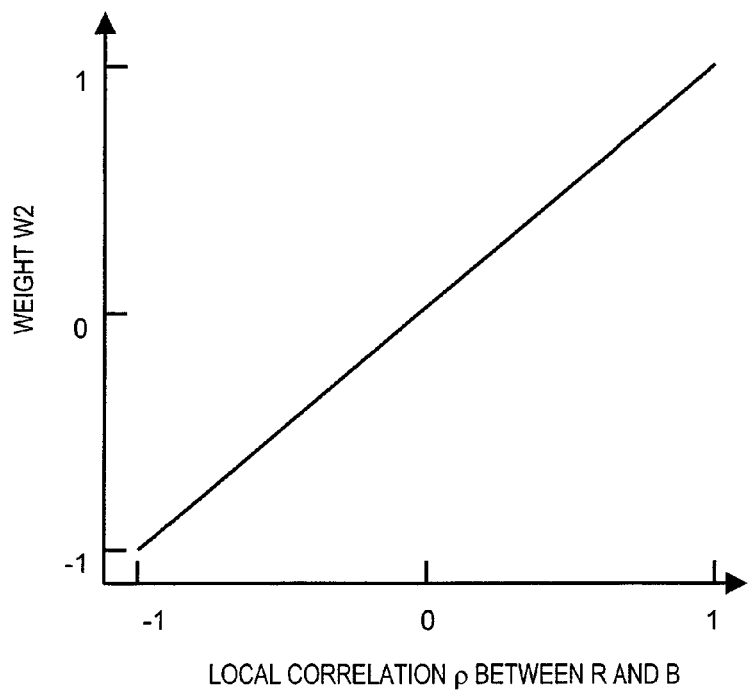
FIG. 9 shows an example of the relationship between the correlation value ρ and the weight W2.

The weight generation section 116 generates a weight in accordance with the correlation value calculated by the local correlation calculation section 115. FIG. 9 shows an example of the relationship between the correlation value ρ and weight W2. The weight generation section 116 finds the weight W2 based on the correlation value ρ and the relationship shown in FIG. 9.

As shown in FIG. 8, the weight generated and output by the weight generation section 116 is multiplied by a difference between $G_{HH}$ and $G_{LH}$ (namely, the high frequency component of G) to update the image memory 118. In more detail, after the multiplication, an address in accordance with the position in the image memory 118 at which the image data is stored is specified. The multiplication result and the value held at the address are added together, and the value of the address is rewritten by the addition result.

In this process, the target to be written in the image memory 118 may be one pixel or pixels in a range obtained by calculating the local correlation value. Note that when a high frequency component is superimposed on a plurality of pixels as in the latter case, the high frequency component may be superimposed on the same pixel a plurality of times, depending on the manner of setting of the area for which the local correlation is calculated (namely, the manner of incrementing in the image). In consideration of such a case, the upconverter 107 for R and B shown in FIG. 8 uses the counter 117. The counter 117 stores the number of times the high frequency component is superimposed for each pixel.

The normalization section 119 divides the high frequency component superimposed a plurality of times by the number of times of write which is stored in the counter 117 for each pixel. The normalized high frequency component is superimposed on the R and B images processed with interpolation and expansion by the interpolation and expansion section 114 and output as $R_{HH}$ and $B_{HH}$.

By increasing the resolutions of R and B by the above-described method, the resolutions of R and B can be increased while the local color balance is maintained. As a result, the resolutions can be increased while the generation of false colors is suppressed.

FIG. 9 shows the linear relationship as an example of the relationship between the correlation value and the weight. This is merely an example, and the relationship may be made nonlinear in consideration of the γ characteristic at the time of imaging or display. Alternatively, the weight may be normalized by (local average of R)/(local average of G) for R, and by (local average of B)/(local average of G) for B. Such normalization can adjust the amplitude of the high frequency component of G, which is superimposed on R and B, in accordance with the pixel values of R, G and B. Thus, the sense of discomfort caused at the time of observation by excessive superimposition of the high frequency can be reduced. As the local averages of R, G and B, the pixel values of $R_{LH}$ and $B_{LH}$ processed with interpolation and expansion, and the pixel value of $G_{LH}$ obtained by downconverting $G_{HH}$ by the downconverter 113 shown in FIG. 8 may be used.

Figure 10:
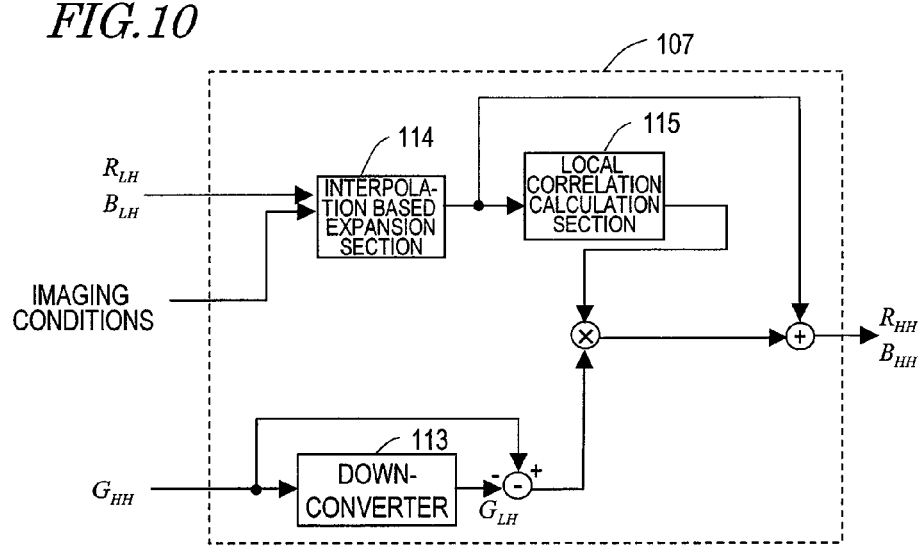
FIG. 10 shows a structure of an upconverter 107 for R and B in a modification.

In the case where the high frequency component is superimposed on the R and B images processed with interpolation and expansion only once for each pixel, the image memory 118, the counter 117 and the normalization section 119 shown in FIG. 8 are unnecessary, and the structure shown in FIG. 10 can be adopted. FIG. 10 shows a modification of the structure of the upconverter 107 for R and B. As shown in FIG. 10, the upconverter 107 for R and B can be realized with a simpler structure than that of FIG. 8 and substantially the same effect can be provided.

The resolution increasing processing for R and B performed by the upconverter 107 for R and B is not limited to the above-described, so-called reconstruction type super resolution processing or the processing of superimposing the high frequency component of G on the R and B components. The relationship between the G component having the resolution thereof increased and the G component obtained by decreasing the resolution thereof (i.e., $G_{HH}$ and $G_{LH}$) may be learned and the resolutions of the R and B components may be increased based on the result of learning.

The learning is not limited to being performed during the processing of the input image, and may be performed with a learning pattern prepared in advance. In this case, the relationship between the G component having a low resolution and the G component having a high resolution, as well as the relationship between the RGB components having a low resolution and the RGB components having a high resolution, can be learned.

In the above description, an output signal is a component of each color of R, G and B. Hereinafter, an imaging and processing device which outputs each output signal of R, G and B after converting such a signal into a luminance signal and a color difference signal will be described.

Figure 11:
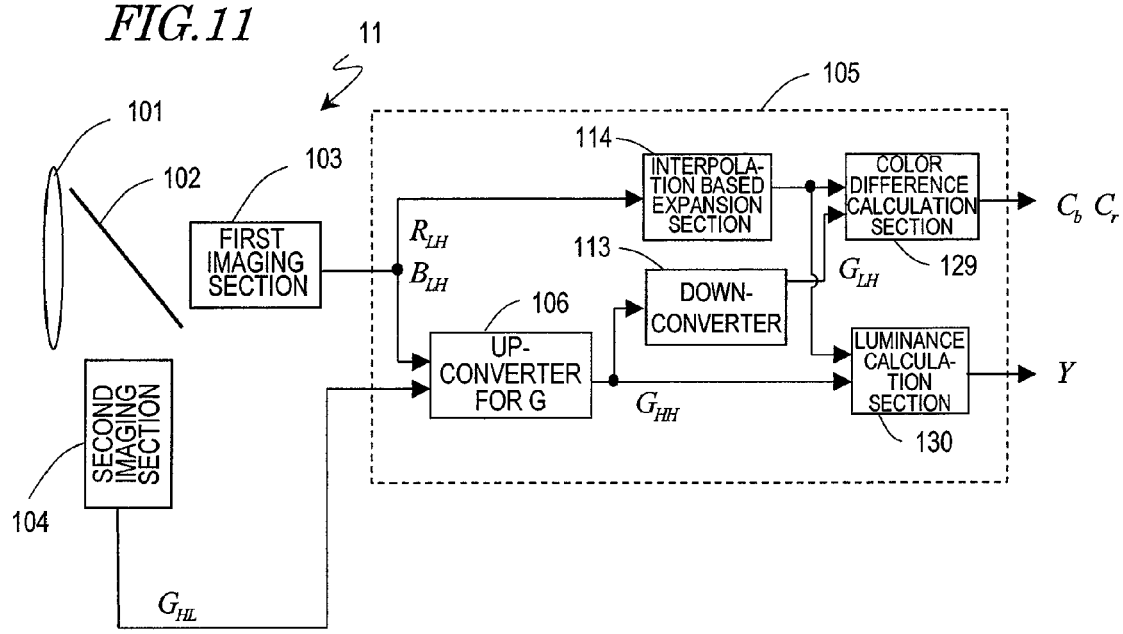
FIG. 11 shows a structure of an imaging and processing device 11 according to a modification of Embodiment 1.

FIG. 11 shows a structure of an imaging and processing device 11 in a modification of this embodiment. In FIG. 11, elements common to those in the above-described imaging and processing devices bear identical reference numerals thereto and descriptions thereof will be omitted.

The image processing section 105 includes a color difference calculation section 129 and a luminance calculation section 130 in addition to the upconverter 106 for G, the interpolation and expansion section 114 and the downconverter 113.

The control section 120 receives a signal of an R component and a B component processed with interpolation and expansion by the interpolation and expansion section 114 and a signal of a G component having the resolution thereof decreased by the downconverter 113, converts the signals into color difference signals (Cb signal, Cr signal) by the calculation of expression 32 and outputs the resultant signals.

$$C_b = 0.564(B-Y) = -0.169R - 0.331G + 0.500B$$

$$Cr = 0.713(R-Y) = 0.500R - 0.419G - 0.081B \qquad \text{[Expression 32]}$$

The luminance calculation section 130 receives the signal of the R component and the B component processed with interpolation and expansion by the interpolation and expansion section 114 and the signal of the G component having the resolution thereof increased by the upconverter for G, converts the signals into a luminance signal (Y signal) by the calculation of expression 33 and outputs the resultant signal.

$$Y = 0.299R + 0.587G + 0.114B \qquad \text{[Expression 33]}$$

As can be understood from the explanation on the color difference calculation section 129 and the luminance calculation section 130, G having the resolution thereof decreased is used for calculating the color difference components Cb and Cr, whereas G having the resolution thereof increased is used for calculating the luminance component Y. Thus, the resolution of the output image can be increased while the generation of false colors is suppressed.

In a stage after the image processing section 105, a block for converting the Y, Cb and Cr signals into RGB signals may be further provided so as to output signals of RGB components.

In the case where the output signal does not need to represent a color image and may represent a monochrome image, it is not necessary to increase the resolution of the R component or the B component in consideration of the visual sight. In this case, a structure shown in FIG. 12 may be adopted.

Figure 12:
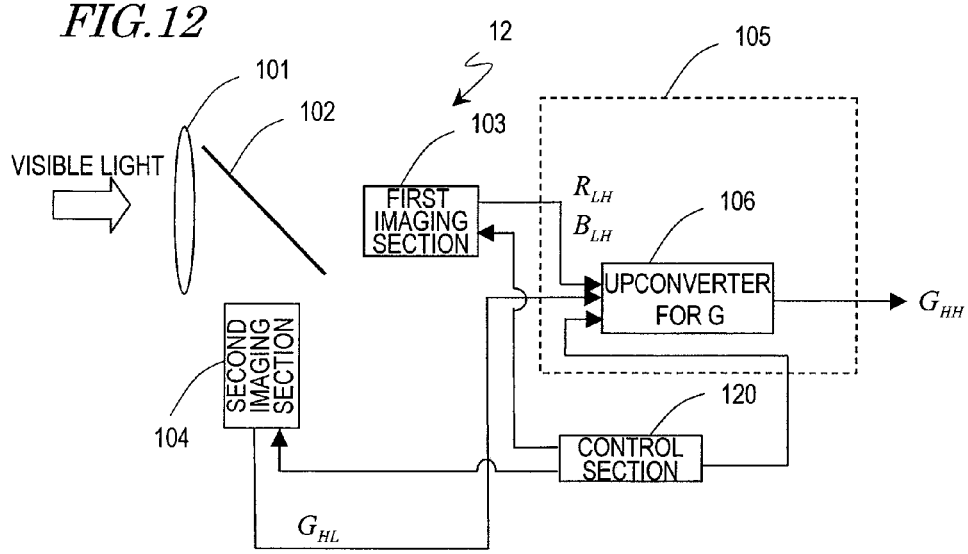
FIG. 12 shows a structure of an imaging and processing device 12 according to another modification of Embodiment 1.

FIG. 12 shows a structure of an imaging and processing device 12 according to a modification of this embodiment. Since it is not necessary to increase the resolution of the R component or the B component, the imaging and processing device 12 does not include the upconverter 107 for R and B which is included in the imaging and processing device 1 (FIG. 1). The imaging and processing device 12 outputs only the $G_{HH}$ signal for green having the resolution thereof increased.

The imaging and processing devices in this embodiment and modification thereof image the G component with a high resolution, a long-time exposure and a low frame rate and image the R component and the B component with a low resolution, a short-time exposure and a high frame rate. This is merely an example. Regarding which color component (wavelength) is to be imaged with a high resolution, a long-time exposure and a low frame rate, other examples may be adopted.

When it is well expected in advance that the B component appears strongly in a scene, for example, when the scene in water such as the sea, pool or the like is to be imaged, the B component may be imaged with a high resolution, a long-time exposure and a low frame rate whereas the R component and the B component may be imaged with a low resolution, a short-time exposure and a high frame rate. In this way, an image which gives the observer a stronger impression that the resolution is high can be presented.

Figure 13:
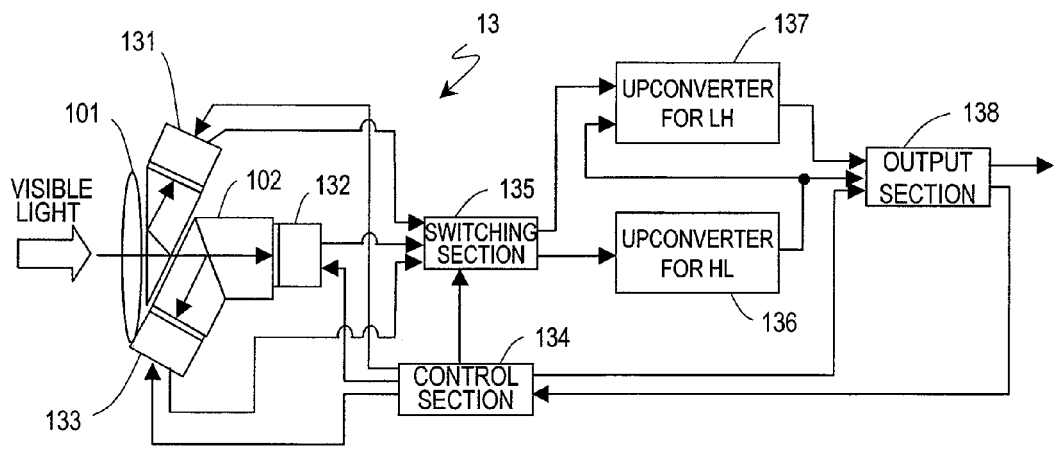
FIG. 13 shows a structure of an imaging and processing device 13, which is obtained by as a result of generalizing the imaging and processing device 1.

For example, FIG. 13 shows a structure of an imaging and processing device 13 obtained as a result of generalizing the imaging and processing device 1. In FIG. 13, elements common to those in the imaging and processing device shown in FIG. 1 bear identical reference numerals thereto and descriptions thereof will be omitted.

The imaging and processing device 13 includes an R component imaging section 131, a G component imaging section 132, a B component imaging section 133, a control section 134, a switching section 135, an upconverter 136 for HL, an upconverter 137 for LH, and an output section 138. Hereinafter, a function of each element will be described together with an operation of the imaging and processing device 13.

Visible light transmitted through the optical system 101 is divided in terms of wavelength by a dichroic prism and imaged by the R component imager 131, the G component imager 132 and the B component imager 133. The number of pixels of each of RGB components readable by the imaging sections 131, 132 and 133 can be independently and dynamically set by the binning read method. The "binning read method" is a method of adding and reading charges accumulated in adjacent pixels. In the imaging sections 131, 132 and 133, the exposure time and frame rate can also be set similarly. The conditions for read are set by the control section 134.

The control section 134 sets either one of the R component imager 131, the G component imager 132 and the B component imager 133 to perform imaging with a high resolution, a long-time exposure and a low frame rate (corresponding to G in Embodiment 1), and sets the remaining two to perform imaging with a low resolution, a short-time exposure and a high frame rate (corresponding to R and B in Embodiment 1), in accordance with the distribution of color components in the scene.

At the start of the imaging, the distribution of the color components in the scene is not known yet. Therefore, for example, G may be set to be imaged with a high resolution, a long-time exposure and a low frame rate.

The switching section 135 performs a switching operation in accordance with the setting of the imaging sections 131, 132 and 133 for the RGB components provided by the control section, such that imaging data of the component set to be imaged with a high resolution, a long-time exposure and a low frame rate is input to the upconverter 136 for HL and the data of the other components is input to the upconverter 137 for LH.

The upconverter 136 for HL spatially increases the resolution of a moving image of the component taken with a high resolution, a long-time exposure and a low frame rate by the same processing as that of the upconverter 106 for G (shown in, for example, FIG. 1).

The upconverter 137 for LH receives moving images of two systems (two color components) taken with a low resolution, a short-time exposure and a high frame rate and the moving image having the resolution thereof increased by the upconverter 136 for HL and spatially increases the resolutions of the moving images of the two systems by the same processing as that of the upconverter 107 for R and B (shown in, for example, FIG. 1).

The output section 138 receives the moving images having the resolutions thereof increased by the upconverter 136 for HL and the upconverter 137 for LH and outputs the moving images of three systems of RGB in accordance with the setting by the control section 134. Needless to say, the output section 138 may output the moving images, which are converted into images of another signal format such as, for example, a luminance signal (Y) and color difference signals (Cb, Cr).

Embodiment 2

In Embodiment 1 described above, the imaging processing and the resolution increasing processing are performed by the same system. However, these two types of processing do not need to be performed by the same system.

In this embodiment, the imaging processing and the resolution increasing processing are performed by different systems.

Figure 14:
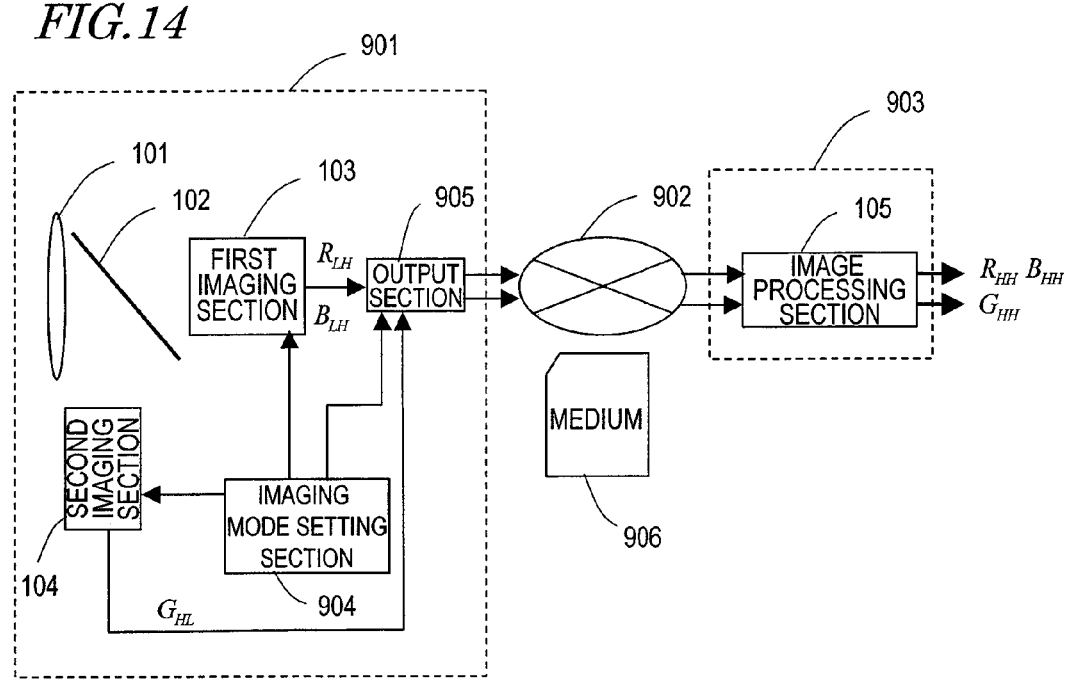
FIG. 14 shows an example of an image processing system according to Embodiment 2 including an imaging device 901, a network 902 and a processing device 903.

FIG. 14 shows an example of an image processing system in this embodiment including an imaging device 901, a network 902 and a processing device 903. An image processing system according to this embodiment can be constructed using a medium 906 instead of the network 902. In FIG. 14, elements common to those in the imaging and processing device according to Embodiment 1 (shown in, for example, FIG. 1) bear identical reference numerals thereto and descriptions thereof will be omitted.

The imaging device 901 includes a lens system 101, a dichroic mirror 102, a first imaging section 103, a second imaging section 104, and an imaging mode setting section 904.

The first imaging section 103 images an R component and a B component of a color image with a short-time exposure, a low resolution and a high frame rate and outputs an R image $R_{LH}$ and a B image $B_{LH}$. The second imaging section 104 images a G component of the color image with a long-time exposure, a high resolution and a low frame rate and outputs a G image $G_{HL}$.

The imaging mode setting section 904 sets variable imaging conditions of, for example, the frame rate, the exposure time and the like of the second imaging section 104, and writes information indicating the set conditions in a comment area in a header of a video signal and outputs the information to the network 902 via an output section 905, or outputs the information to the network 902 via the output section 905 as separate data.

The output section 905 outputs the G image $G_{HL}$, the R image $R_{LH}$ and the B image $B_{LH}$ taken by the imaging device 901, and also the information on the imaging conditions to the network 902 or the medium 906.

The processing device 903 includes an image processing section 105. The image processing section 105 receives $G_{HL}$, $R_{LH}$ and $B_{LH}$ and the information on the imaging conditions via the network 902 or the medium 906, and outputs $G_{HH}$, $R_{HH}$ and $B_{HH}$ each having the resolution thereof increased spatially or temporally by the processing described in Embodiment 1.

Owing to the above-described structure, the imaging device and the processing device, even though being of separate bodies and spatially discrete from each other, can send and receive the moving image signals and information on the imaging conditions via the network 902 or the medium 906. Thus, the processing device can output a moving image having high temporal and spatial resolutions.

The network 902 may be a LAN (Local Area Network) constructed in a house or a WAN (Wide Area Network) such as the Internet or the like. Alternatively, the network 902 may be a communication line of a USB standard or an IEEE 1394 standard, and may be wireless or wired. The medium 906 may be, for example, an optical disc, a removable disc such as a removable hard disc or the like, or a flash memory card.

In the above embodiments, the imaging and processing device is described as including any of the various structures shown in the figures. For example, the image processing section included in each structure is described as a functional block. Such functional blocks may be realized, as hardware, as one semiconductor chip such as a digital signal processor (DSP) or the like or an IC, or may be realized using, for example, a computer and software (computer program).

Figure 15:
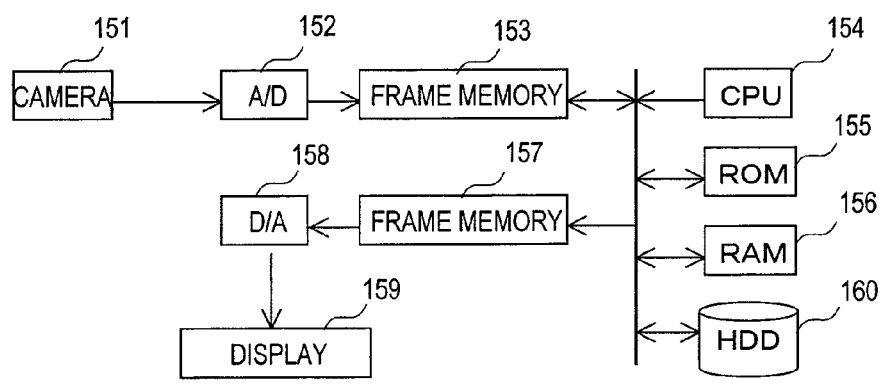
FIG. 15 shows hardware of an image processing device constructed by a computer.

For example, FIG. 15 shows hardware of an image processing device constructed by a computer.

The functional blocks of the image processing device in each embodiment and the hardware shown in FIG. 15 have the following correspondence. In the following, the correspondence will be described with the image processing device 1 mainly shown in FIG. 1 as an example.

The lens system 101, the dichroic mirror 102, the first imaging section 103 and the second imaging section 104 of the imaging and processing device 1 correspond to a camera 151 and an A/D converter 152 shown in FIG. 15. A temporary buffer (not shown) used by the image processing section 105 in actual processing and the medium 906 correspond to a frame memory 153 or a hard disc drive (HDD) 160 shown in FIG. 15. The control section 120 and the image processing section 105 are realized by a CPU 154 shown in FIG. 15 for executing a computer program.

The computer program for causing the computer shown in FIG. 15 to operate is stored on, for example, a ROM 155. Alternatively, the computer program may be stored on an optical disc or a magnetic disc. Still alternatively, the computer program may be transferred via a wired or wireless network, broadcast or the like and stored on a RAM 156 of the computer.

The computer program is read onto the RAM 156 by the CPU 154 as a processor and extended. The CPU 154 executes coded instructions, which form the substance of the computer program. A digital image signal obtained as a result of execution of each instruction is sent to, and temporarily stored in, the frame memory 157, converted into an analog signal by the D/A converter 158 and sent to, and displayed by, a display 159.

The processing of the computer program for realizing the image processing section 105 is described, for example, along with a flowchart explained below.

Figure 16:
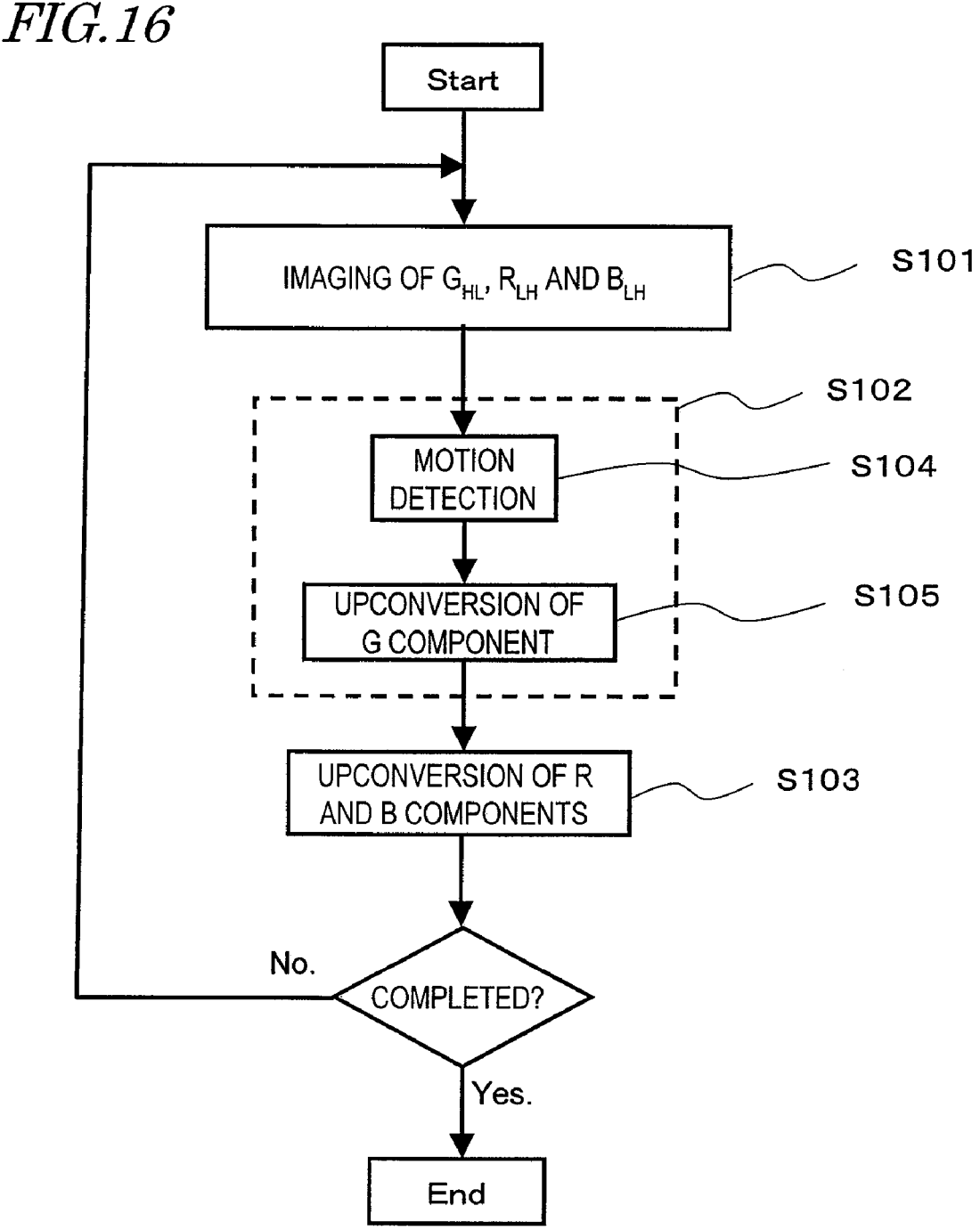
FIG. 16 is a flowchart showing a procedure of processing according to the present invention.

For example, FIG. 16 is a flowchart showing a procedure of the processing according to the present invention. This processing will be explained as the processing according to Embodiment 1, but may be considered as being executed independently by the imaging device 901 and the processing device 903 in Embodiment 2.

First, in step S101, the first imaging section 103 and the second imaging section 104 take a G image $G_{HL}$ with a long-time exposure, a high resolution and a low frame rate and an R image $R_{LH}$ and a B image $B_{LH}$ with a short-time exposure, a low resolution and a high frame rate. In step S102, the upconverter 106 for G of the image processing section 105 increases the resolution of the moving image of the G component. More specifically, this step can be divided into step S104 and step S105. In step S104, the motion detection section 108 of the upconverter 106 for G performs motion detection. In step S105, the temporal upconverter 109 uses the result of the motion detection or the like to find $G_{HH}$ which minimizes expression 3 based on expression 4.

Next in step S103, the upconverter 107 for R and B increases the resolution of the moving image of each of R and B components. Then, the control section 120 determines whether or not the imaging has been completed. When it is determined that the imaging has not been completed, the processing is repeated from step S101. When it is determined that the imaging has been completed, the processing is terminated.

Figure 17:
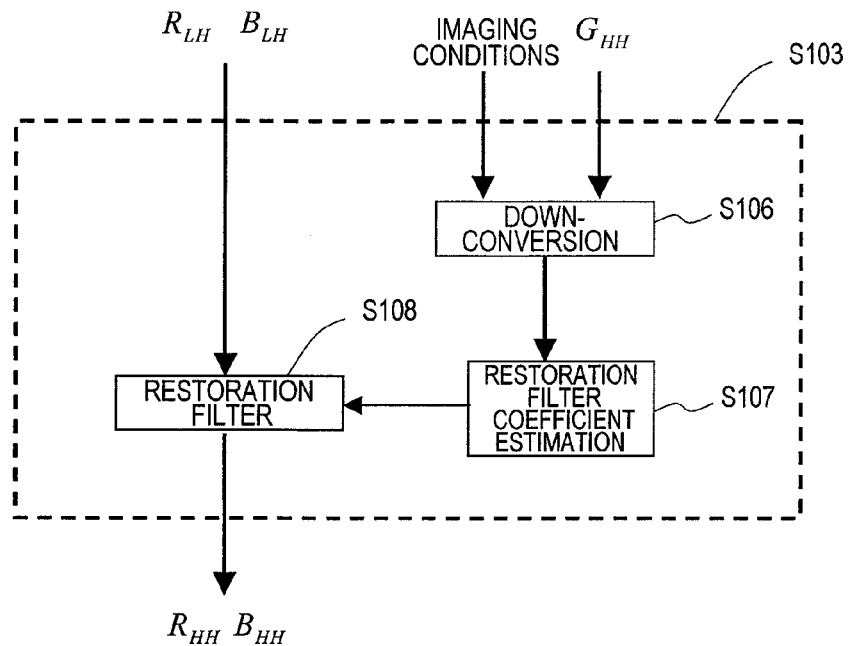
FIG. 17 is a flowchart showing a detailed procedure of the processing in step S103 shown in FIG. 16.

FIG. 17 is a flowchart showing a detailed procedure of step S103 shown in FIG. 16. This processing corresponds to the processing performed by the upconverter 107 for R and B shown in FIG. 7.

In step S106 shown in FIG. 17, the downconverter 110 decreases the resolution of $G_{HH}$ based on the imaging conditions. In step S107, the coefficient estimation section 111 estimates a coefficient to be applied to the restoration filter 112. In step S108, the estimated coefficient is applied to the restoration filter 112, and the restoration filter 112 increases the resolutions of $R_{LH}$ and $B_{LH}$ and outputs $R_{HH}$ and $B_{HH}$.

Figure 18:
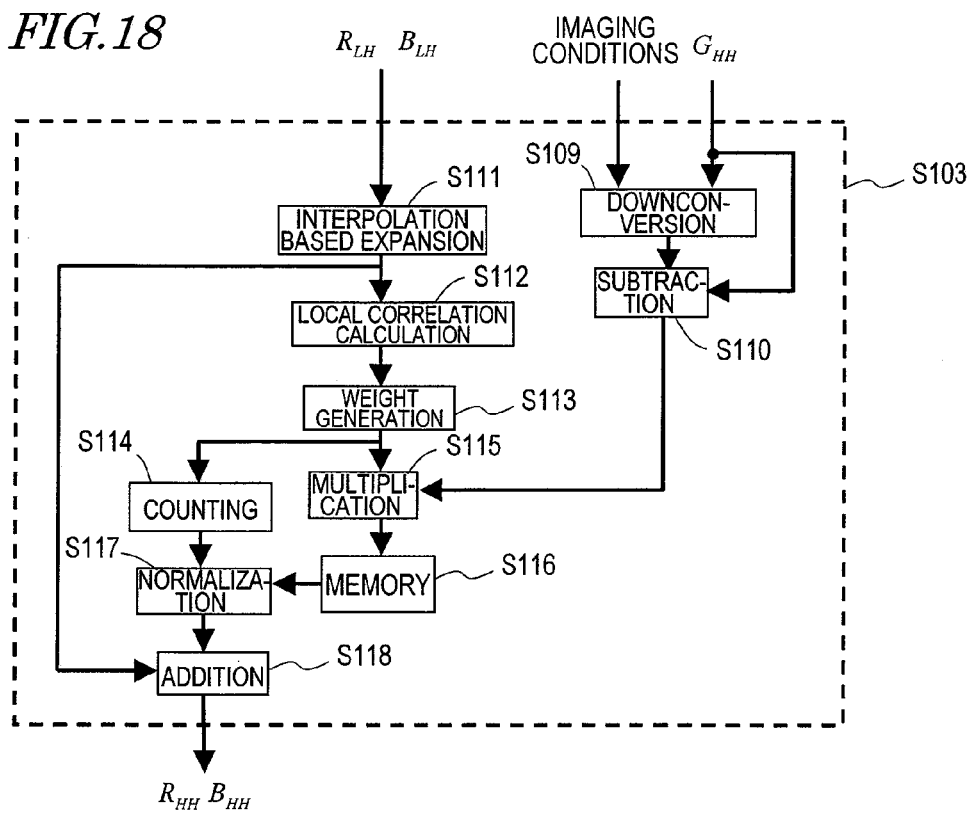
FIG. 18 is a flowchart showing a detailed procedure of processing in step S103 in another example.

FIG. 18 is a flowchart showing a detailed procedure of step S103 in another example. This processing corresponds to the processing performed by the upconverter 107 for R and B shown in FIG. 8.

In step S109, the downconverter 113 decreases the resolution of $G_{HH}$ based on the imaging conditions. In step S110, $G_{LH}$ is subtracted from $G_{HH}$.

In the meantime, in step S111, the interpolation and expansion section 114 performs interpolation and expansion on $R_{LH}$ and $B_{LH}$ based on the imaging conditions. Based on the resultant signals, in step S112, the local correlation calculation section 115 calculates a local correlation value.

In step S113, the weight generation section 116 generates a weight. In step S114, the counter 117 stores the number of times the high frequency component is superimposed for each pixel. In step S115, the weight generated and output by the weight generation section 116 is multiplied by the difference between $G_{HH}$ and $G_{LH}$ (namely, the high frequency component of G). In step S116, the image memory 118 is updated.

In step S117, the normalization section 119 divides the high frequency component stored in the image memory 118 and superimposed a plurality of times by the number of times of write stored in the counter 117 for each pixel to normalize the high frequency component.

In step S118, the normalized high frequency component is superimposed on the R and B images processed with interpolation and expansion by the interpolation and expansion section 114 and output as $R_{HH}$ and $B_{HH}$.

Various embodiments of the present invention have been described. In Embodiments 1 and 2, the three components of R, G and B are separated by a dichroic mirror. The color separation is not limited to such a form. For example, a single imaging device for taking an image in three separate layers in the depth direction of R+G+B, R+B and R sequentially may be used. In this case also, an image of R+G or R+G+B is taken with a high resolution, a long-time exposure and a low frame rate, and the other images are taken with a low resolution, a short-time exposure and a high frame rate. These images are received and processed, and thus substantially the same effect can be provided.

INDUSTRIAL APPLICABILITY

An imaging device and a processing device according to the present invention are useful for taking a high precision image by a camera having a reduced-sized imaging element and for a reproduction apparatus and a system for processing the resultant image. The imaging device and the processing device according to the present invention can be realized as a computer program.

The invention claimed is:

1. An imaging and processing device, comprising:
   a separation section for separating visible light into at least a first color component and a second color component so that primarily only the first color component is incident a first imaging section and so that primarily only the second color component is incident a second imaging section;
   the first imaging section for taking a moving image of the first color component, the first imaging section taking images which form the moving image with a first spatial resolution and a first temporal resolution by exposure for a first charge accumulation time period;
   the second imaging section for taking a moving image of the second color component, the second imaging section taking images which form the moving image with a second spatial resolution higher than the first spatial resolution and a second temporal resolution lower than the first temporal resolution by exposure for a second charge accumulation time period longer than the first charge accumulation time period;
   a control section for controlling imaging conditions of the first imaging section and the second imaging section; and
   a processing section for generating a moving image of the second component having the temporal and spatial resolutions thereof increased, based on information on the moving image of the first color component and information on the moving image of the second color component.

2. The imaging and processing device of claim 1, wherein:
   the processing section holds a relational expression of the moving image of the second color component taken by the second imaging section and the moving image of the second component having the spatial resolution thereof increased; and
   the processing section outputs a moving image fulfilling the relational expression as the moving image of the second component having the spatial resolution thereof increased, using, as constraining conditions, temporal and spatial correspondence between the moving image of the first color component and the moving image of the second component, and a condition for smoothness between pixels close to each other in the image.

3. The imaging and processing device of claim 1, further comprising a third imaging section, wherein:
   the separation section separates the visible light into the first color component, the second color component and a third color component;
   the third imaging section takes images which form a moving image of the third color component with a third spatial resolution and a third temporal resolution by exposure for a third charge accumulation time period; and the third charge accumulation time period is shorter than the second charge accumulation time period, the third spatial resolution is lower than the second spatial resolution, and the third temporal resolution is higher than the second temporal resolution.

4. The imaging and processing device of claim 3, wherein:
the processing section holds a relational expression of the moving image of the second color component taken by the second imaging section and the moving image of the second component having the spatial resolution thereof increased; and
the processing section outputs a moving image fulfilling the relational expression as the moving image of the second component having the spatial resolution thereof increased, using, as constraining conditions, temporal and spatial correspondence between the moving image of the first color component, the moving image of the second color component and the moving image of the third color component, and a local correlation among pixel values of the first color component, the second color component and the third color component.

5. The imaging and processing device of claim 3, wherein:
the processing section holds a relational expression of the moving image of the second color component taken by the second imaging section and the moving image of the second component having the spatial resolution thereof increased; and
the processing section outputs a moving image fulfilling the relational expression as the moving image of the second component having the spatial resolution thereof increased, using, as constraining conditions, temporal and spatial correspondence among the moving image of the first color component, the moving image of the second color component and the moving image of the third color component, a condition for smoothness between pixels close to each other in the image, an assumption that the brightness of an imaging subject moving in the image is constant, and a local correlation among pixel values of the first color component, the second color component and the third color component.

6. The imaging and processing device of claim 1, wherein the first color component is one of red and blue, and the second color component is green.

7. An imaging and processing device, comprising:
a separation section for separating visible light into at least a first color component and a second color component so that primarily only the first color component is incident a first imaging section and so that primarily only the second color component is incident a second imaging section;
the first imaging section for taking a moving image of the first color component, the first imaging section taking images which form the moving image with a first spatial resolution and a first temporal resolution by exposure for a first charge accumulation time period;
the second imaging section for taking a moving image of the second color component, the second imaging section taking images which form the moving image with a second spatial resolution higher than the first spatial resolution and a second temporal resolution lower than the first temporal resolution by exposure for a second charge accumulation time period longer than the first charge accumulation time period;
a motion detection section for generating motion information based on a time-wise change of the moving image of the first color component; and a processing section for generating a moving image of the second component having the temporal and spatial resolutions thereof increased, based on information on the moving image of the first color component, information on the moving image of the second color component and the motion information.

8. The imaging and processing device of claim 7, wherein:
the processing section holds a relational expression of the moving image of the second color component taken by the second imaging section and the moving image of the second component having the spatial resolution thereof increased; and
the processing section generates the moving image of the second component having the spatial resolution thereof increased, in accordance with the degree at which the relational expression is fulfilled, using, as constraining conditions, temporal and spatial correspondence between the moving image of the first color component and the moving image of the second color component, a condition for smoothness between pixels close to each other in the image, an assumption that the brightness of an imaging subject moving in the image is constant, and a local correlation between pixel values of the first color component and the second color component.

9. The imaging and processing device of claim 8, wherein the processing section outputs a moving image, which fulfills the relational expression best under the moving image of the second color component taken by the second imaging section and the constraining conditions, as the moving image of the second component having the spatial resolution thereof increased.

10. The imaging and processing device of claim 7, wherein:
the processing section holds a relational expression of the moving image of the second color component taken by the second imaging section and the moving image of the second component having the spatial resolution thereof increased; and
the processing section outputs a moving image fulfilling the relational expression as the moving image of the second component having the spatial resolution thereof increased, using, as constraining conditions, temporal and spatial correspondence between the moving image of the first color component and the moving image of the second color component, a condition for smoothness between pixels close to each other in the image, and an assumption that the brightness of an imaging subject moving in the image is constant.

11. The imaging and processing device of claim 7, wherein:
the processing section holds a relational expression of the moving image of the second color component taken by the second imaging section and the moving image of the second component having the spatial resolution thereof increased; and
the processing section outputs a moving image fulfilling the relational expression as the moving image of the second component having the spatial resolution thereof increased, using, as constraining conditions, temporal and spatial correspondence between the moving image of the first color component and the moving image of the second component, and a condition for smoothness between pixels close to each other in the image.

12. The imaging and processing device of claim 7, further comprising a third imaging section, wherein:

the separation section separates the visible light into the first color component, the second color component and a third color component;

the third imaging section takes images which form a moving image of the third color component with a third spatial resolution and a third temporal resolution by exposure for a third charge accumulation time period; and the third charge accumulation time period is shorter than the second charge accumulation time period, the third spatial resolution is lower than the second spatial resolution, and the third temporal resolution is higher than the second temporal resolution.

13. The imaging and processing device of claim 7, wherein the first color component is one of red and blue, and the second color component is green.

14. An imaging device forming an image processing system together with an image processing device, the imaging device comprising:
a separation section for separating visible light into at least a first color component and a second color component so that primarily only the first color component is incident a first imaging section and so that primarily only the second color component is incident a second imaging section;
the first imaging section for taking a moving image of the first color component, the first imaging section taking images which form the moving image with a first spatial resolution and a first temporal resolution by exposure for a first charge accumulation time period;
the second imaging section for taking a moving image of the second color component, the second imaging section taking images which form the moving image with a second spatial resolution higher than the first spatial resolution and a second temporal resolution lower than the first temporal resolution by exposure for a second charge accumulation time period longer than the first charge accumulation time period; and
a control section for controlling imaging conditions of the first imaging section and the second imaging section;
wherein the imaging device outputs information on the moving image of the first color component and information on the moving image of the second color component in order to allow the image processing device to generate a moving image of the second component having the temporal resolution thereof increased.

15. The imaging device of claim 14, further comprising a third imaging section, wherein:
the separation section separates the visible light into the first color component, the second color component and a third color component;
the third imaging section takes images which form a moving image of the third color component with a third spatial resolution and a third temporal resolution by exposure for a third charge accumulation time period; and
the third charge accumulation time period is shorter than the second charge accumulation time period, the third spatial resolution is lower than the second spatial resolution, and the third temporal resolution is higher than the second temporal resolution.

16. The imaging device of claim 14, wherein the first color component is one of red and blue, and the second color component is green.

17. An image processing device for receiving information on a moving image from an imaging device and processing the information, wherein:
the imaging device includes:
a separation section for separating visible light into at least a first color component and a second color component so that primarily only the first color component is incident a first imaging section and so that primarily only the second color component is incident a second imaging section;
the first imaging section for taking a moving image of the first color component, the first imaging section taking images which form the moving image with a first spatial resolution and a first temporal resolution by exposure for a first charge accumulation time period;
the second imaging section for taking a moving image of the second color component, wherein the second imaging section taking images which form the moving image with a second spatial resolution higher than the first spatial resolution and a second temporal resolution lower than the first temporal resolution by exposure for a second charge accumulation time period longer than the first charge accumulation time period; and
a control section for controlling imaging conditions of the first imaging section and the second imaging section;
the image processing device comprising:
a motion detection section for receiving information on the moving image of the first color component and information on the moving image of the second color component and generating motion information based on a time-wise change of the moving image of the first color component; and
a processing section for generating a moving image of the second component having the spatial resolution thereof increased, based on the information on the moving image of the first color component, the information on the moving image of the second color component and the motion information.

18. The image processing device of claim 17, wherein the first color component is one of red and blue, and the second color component is green.

19. An image processing method, comprising the steps of:
receiving, from the imaging device of claim 14, the information on the taken moving image of the first color component and the information on the taken moving image of the second color component;
generating motion information based on a time-wise change of the moving image of the first color component;
obtaining a relational expression of the moving image of the second color component and a moving image of the second component having a spatial resolution thereof increased; and
generating the moving image of the second component having the spatial resolution thereof increased, in accordance with the degree at which the relational expression is fulfilled, using, as constraining conditions, temporal and spatial correspondence between the moving image of the first color component and the moving image of the second color component, a condition for smoothness between pixels close to each other in the image, and an assumption that the brightness of an imaging subject moving in the image is constant.

20. The image processing method of claim 19, wherein the first color component is one of red and blue, and the second color component is green.

21. The image processing method of claim 19, wherein the step of generating the moving image of the second component generates the moving image of the second component having the spatial resolution thereof increased, in accordance with the degree at which the relational expression is fulfilled, further using, as a constraining condition, a local correlation between the pixel values of the first color component and the second color component.

22. An image processing method, comprising the steps of:
receiving, from the imaging device of claim 14, the information on the taken moving image of the first color component and the information on the taken moving image of the second color component;
obtaining a relational expression of the moving image of the second color component and a moving image of the second component having a spatial resolution thereof increased; and
generating the moving image of the second component having the spatial resolution thereof increased, in accordance with the degree at which the relational expression is fulfilled, using, as constraining conditions, temporal and spatial correspondence between the moving image of the first color component and the moving image of the second color component, and a condition for smoothness between pixels close to each other in the image.

23. The image processing method of claim 22, wherein the first color component is one of red and blue, and the second color component is green.

24. An image processing method, comprising the steps of:
receiving, from the imaging device of claim 14, the information on the taken moving image of the first color component and the information on the taken moving image of the second color component;
obtaining a relational expression of the moving image of the second color component and a moving image of the second component having a spatial resolution thereof increased; and
generating the moving image of the second component having the spatial resolution thereof increased, in accordance with the degree at which the relational expression is fulfilled, using, as constraining conditions, temporal and spatial correspondence between the moving image of the first color component and the moving image of the second color component, and a local correlation between the pixel values of the first color component and the second color component.

25. An image processing method, comprising the steps of:
receiving, from the imaging device of claim 15, the information on the taken moving images of the first color component, the second color component and the third color component;
obtaining a relational expression of the moving image of the second color component and a moving image of the second component having a spatial resolution thereof increased; and
outputting a moving image fulfilling the relational expression as the moving image of the second component having the spatial resolution thereof increased, using, as constraining conditions, temporal and spatial correspondence among the moving image of the first color component, the moving image of the second color component and the moving image of the third color component, a condition for smoothness between pixels close to each other in the image, an assumption that the brightness of an imaging subject moving in the image is constant, and a local correlation among the pixel values of the first color component, the second color component and the third color component.

26. A non-transitory computer-readable medium comprising a computer program for causing a processor included in an image processing device to generate data on a moving image based on data on a first moving image and data on a second moving image, the computer program causing the processor to execute the steps of: receiving, from the imaging device of claim 11, the information on the taken moving images of the first color component, the second color component and the third color component; reading a relational expression of the moving image of the second color component and a moving image of the second component having a spatial resolution thereof increased; and generating a moving image of the second component having a spatial resolution thereof increased, in accordance with the degree at which the relational expression is fulfilled, using, as constraining conditions, temporal and spatial correspondence between the moving image of the first color component and the moving image of the second color component, a condition for smoothness between pixels close to each other in the image, an assumption that the brightness of an imaging subject moving in the image is constant, and a local correlation between the pixel values of the first color component and the second color component.

27. An imaging and processing device, comprising:
a separation section for separating visible light into at least a first color component and a second color component, wherein the separation section is a dichroic mirror;
a first imaging section for taking a moving image of the first color component, the first imaging section taking images which form the moving image with a first spatial resolution and a first temporal resolution by exposure for a first charge accumulation time period;
a second imaging section for taking a moving image of the second color component, the second imaging section taking images which form the moving image with a second spatial resolution higher than the first spatial resolution and a second temporal resolution lower than the first temporal resolution by exposure for a second charge accumulation time period longer than the first charge accumulation time period;
a control section for controlling imaging conditions of the first imaging section and the second imaging section; and
a processing section for generating a moving image of the second component having the temporal and spatial resolutions thereof increased, based on information on the moving image of the first color component and information on the moving image of the second color component.

28. An imaging and processing device, comprising:
a separation section for separating visible light into at least a first color component and a second color component, wherein the separation section is a dichroic mirror;
a first imaging section for taking a moving image of the first color component, the first imaging section taking images which form the moving image with a first spatial resolution and a first temporal resolution by exposure for a first charge accumulation time period;
a second imaging section for taking a moving image of the second color component, the second imaging section taking images which form the moving image with a second spatial resolution higher than the first spatial resolution and a second temporal resolution lower than the first temporal resolution by exposure for a second charge accumulation time period longer than the first charge accumulation time period;

a motion detection section for generating motion information based on a time-wise change of the moving image of the first color component; and a processing section for generating a moving image of the second component having the temporal and spatial resolutions thereof increased, based on information on the moving image of the first color component, information on the moving image of the second color component and the motion information.

29. An imaging device forming an image processing system together with an image processing device, the imaging device comprising:

a separation section for separating visible light into at least a first color component and a second color component, wherein the separation section is a dichroic mirror;

a first imaging section for taking a moving image of the first color component, the first imaging section taking images which form the moving image with a first spatial resolution and a first temporal resolution by exposure for a first charge accumulation time period;

a second imaging section for taking a moving image of the second color component, the second imaging section taking images which form the moving image with a second spatial resolution higher than the first spatial resolution and a second temporal resolution lower than the first temporal resolution by exposure for a second charge accumulation time period longer than the first charge accumulation time period; and a control section for controlling imaging conditions of the first imaging section and the second imaging section;

wherein the imaging device outputs information on the moving image of the first color component and information on the moving image of the second color component in order to allow the image processing device to generate a moving image of the second component having the temporal resolution thereof increased.

30. An image processing device for receiving information on a moving image from an imaging device and processing the information, wherein:

the imaging device includes:

a separation section for separating visible light into at least a first color component and a second color component, wherein the separation section is a dichroic mirror;

a first imaging section for taking a moving image of the first color component, the first imaging section taking images which form the moving image with a first spatial resolution and a first temporal resolution by exposure for a first charge accumulation time period;

a second imaging section for taking a moving image of the second color component, wherein the second imaging section taking images which form the moving image with a second spatial resolution higher than the first spatial resolution and a second temporal resolution lower than the first temporal resolution by exposure for a second charge accumulation time period longer than the first charge accumulation time period; and a control section for controlling imaging conditions of the first imaging section and the second imaging section;

the image processing device comprising:

a motion detection section for receiving information on the moving image of the first color component and information on the moving image of the second color component and generating motion information based on a time-wise change of the moving image of the first color component; and a processing section for generating a moving image of the second component having the spatial resolution thereof increased, based on the information on the moving image of the first color component, the information on the moving image of the second color component and the motion information.

* * * * *

UNITED STATES PATENT AND TRADEMARK OFFICE
CERTIFICATE OF CORRECTION

| | |
|---|---|
| PATENT NO. | : 8,248,495 B2 |
| APPLICATION NO. | : 12/517852 |
| DATED | : August 21, 2012 |
| INVENTOR(S) | : Takeo Azuma et al. |

Page 1 of 1

It is certified that error appears in the above-identified patent and that said Letters Patent is hereby corrected as shown below:

Col. 42, line 10: --claim 11-- should be "claim 15"

Signed and Sealed this
Eighteenth Day of December, 2012

David J. Kappos
*Director of the United States Patent and Trademark Office*